(12) United States Patent
Bartel et al.

(10) Patent No.: US 10,493,939 B2
(45) Date of Patent: Dec. 3, 2019

(54) LEVER-ACTUATED OPERATOR PROTECTION APPARATUS

(71) Applicant: Excel Industries, Inc., Hesston, KS (US)

(72) Inventors: Harlan John Bartel, Newton, KS (US); Brian L. Nebel, Hesston, KS (US); Royce A. Steinert, Hutchinson, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 93 days.

(21) Appl. No.: 15/786,219

(22) Filed: Oct. 17, 2017

(65) Prior Publication Data

US 2018/0037183 A1 Feb. 8, 2018

Related U.S. Application Data

(63) Continuation-in-part of application No. 15/418,402, filed on Jan. 27, 2017, which is a continuation of
(Continued)

(51) Int. Cl.
*B60R 21/13* (2006.01)
*B60R 22/48* (2006.01)
(Continued)

(52) U.S. Cl.
CPC ............ *B60R 21/131* (2013.01); *A01D 34/64* (2013.01); *A01D 34/824* (2013.01); *A01D 34/828* (2013.01); *A01D 75/20* (2013.01); *B60R 21/11* (2013.01); *B60R 22/48* (2013.01); *F16C 11/04* (2013.01); *F16C 11/10* (2013.01);
(Continued)

(58) Field of Classification Search
CPC ....... B60R 21/11; B60R 21/131; B60R 22/48; B60R 2022/4808; A01D 34/64; A01D 34/824; A01D 34/828; A01D 75/20; A01D 2101/00; F16C 2310/00; F16C 11/04; F16C 11/10
See application file for complete search history.

(56) References Cited

U.S. PATENT DOCUMENTS 2,806,618 A 9/1957 Cook
3,584,897 A 6/1971 Larry et al.
(Continued)

FOREIGN PATENT DOCUMENTS

EP 0051100 A1 5/1982
EP 1197399 A2 4/2002
(Continued)

OTHER PUBLICATIONS

Non-Final Office Action dated Nov. 29, 2018 in U.S. Appl. No. 15/415,630, 8 pages.
(Continued)

*Primary Examiner* — Laura Freedman
(74) *Attorney, Agent, or Firm* — Shook, Hardy & Bacon, LLP

(57) ABSTRACT

Aspects hereof relate to a lever-actuated operator protection apparatus. In some aspects, the lever-actuated operator protection apparatus can be raised and lowered by an operator from a seated position, for example, on a terrain working vehicle.

20 Claims, 24 Drawing Sheets

Related U.S. Application Data application No. 15/041,718, filed on Feb. 11, 2016, now Pat. No. 9,573,548.

(60) Provisional application No. 62/115,868, filed on Feb. 13, 2015.

(51) Int. Cl.

| | | |
|---|---|---|
| *B60R 21/11* | (2006.01) | |
| *A01D 34/82* | (2006.01) | |
| *A01D 34/64* | (2006.01) | |
| *F16C 11/10* | (2006.01) | |
| *F16C 11/04* | (2006.01) | |
| *A01D 75/20* | (2006.01) | |
| *A01D 101/00* | (2006.01) | |

(52) U.S. Cl.
CPC .. *A01D 2101/00* (2013.01); *B60R 2022/4808* (2013.01); *F16C 2310/00* (2013.01)

(56) References Cited

U.S. PATENT DOCUMENTS

| | | | |
|---|---|---|---|
| 3,762,761 | A | 10/1973 | Erickson |
| 3,934,679 | A | 1/1976 | Lieptz |
| 4,202,565 | A | 5/1980 | Mosch |
| 4,666,183 | A | 5/1987 | Azzarello |
| 4,708,389 | A | 11/1987 | Maebayashi et al. |
| 4,715,468 | A | 12/1987 | Baumann et al. |
| 4,840,398 | A | 6/1989 | Matthias et al. |
| 4,877,265 | A | 10/1989 | DeBraal et al. |
| 4,949,991 | A | 8/1990 | Ludwig |
| 5,042,835 | A | 8/1991 | Burns |
| 5,129,676 | A | 7/1992 | Sheehan |
| 5,393,093 | A | 2/1995 | Wunsche et al. |
| 5,503,430 | A | 4/1996 | Miki et al. |
| 5,779,272 | A | 7/1998 | Panek et al. |
| 5,839,758 | A | 11/1998 | Finch et al. |
| 6,322,130 | B1 | 11/2001 | Wandn et al. |
| 6,902,024 | B2 | 6/2005 | Miiller et al. |
| 7,152,903 | B2 | 12/2006 | Westendorf et al. |
| 7,222,882 | B2 | 5/2007 | Boucher |
| 7,311,330 | B2 | 12/2007 | Kachouh |
| 7,396,047 | B1 | 7/2008 | Young |
| 7,434,379 | B2 | 10/2008 | Nogami et al. |
| 7,438,319 | B2 | 10/2008 | Cooper et al. |
| 7,565,732 | B2 | 7/2009 | Le et al. |
| 7,568,732 | B2 | 8/2009 | Schlup, Jr. |
| 7,922,201 | B2 | 4/2011 | Krten et al. |
| 7,971,904 | B2 | 7/2011 | David |
| 7,971,905 | B2 | 7/2011 | McCord et al. |
| 8,016,320 | B2 | 9/2011 | Becker |
| 8,029,019 | B2 | 10/2011 | Schmidt et al. |
| 8,403,363 | B2 | 3/2013 | Duenchel et al. |
| 8,419,061 | B2 | 4/2013 | Fukunaga et al. |
| 8,424,911 | B2 | 4/2013 | Alexander, IV |
| 8,523,225 | B2 | 9/2013 | Reinke et al. |
| 8,528,924 | B1 | 9/2013 | Bartel et al. |
| 8,662,534 | B2 | 3/2014 | Beki |
| 8,905,434 | B1 | 12/2014 | Bartel et al. |
| 9,327,670 | B1 | 5/2016 | Bartel et al. |
| 9,573,548 | B2 | 2/2017 | Bartel et al. |
| 9,616,837 | B1 | 4/2017 | Bartel et al. |
| 2003/0046794 | A1 | 3/2003 | Muir |
| 2005/0082808 | A1 | 4/2005 | Wildig et al. |
| 2005/0212278 | A1 | 9/2005 | Kurten et al. |
| 2005/0217232 | A1 | 10/2005 | Asahara et al. |
| 2006/0001248 | A1 | 1/2006 | Queveau et al. |
| 2007/0094847 | A1 | 5/2007 | Thomson |
| 2007/0209160 | A1 | 9/2007 | Darscheid et al. |
| 2007/0290493 | A1 | 12/2007 | David |
| 2008/0034552 | A1 | 2/2008 | Nguyen |
| 2008/0136155 | A1 | 6/2008 | Janisch et al. |
| 2008/0217897 | A1 | 9/2008 | Latussek |
| 2008/0309058 | A1 | 12/2008 | Kurten et al. |
| 2017/0050600 | A1* | 2/2017 | Bartel .................. B60R 21/131 |
| 2017/0129438 | A1 | 5/2017 | Bartel et al. |
| 2017/0136974 | A1* | 5/2017 | Bartel .................. A01D 34/824 |
| 2018/0037183 | A1 | 2/2018 | Bartel et al. |

FOREIGN PATENT DOCUMENTS

| | | |
|---|---|---|
| EP | 1844990 A2 | 10/2007 |
| FR | 2541953 A1 | 9/1984 |
| GB | 2175259 A | 11/1986 |
| JP | H0640299 A | 2/1994 |
| JP | H07323798 A | 12/1995 |
| JP | H0648259 A | 4/2000 |

OTHER PUBLICATIONS

Final Office Action dated Dec. 31, 2018 in U.S. Appl. No. 15/133,293, 5 pages.

Final Office Action dated Jan. 14, 2019 in U.S. Appl. No. 15/418,402, 8 pages.

Non-Final Office Action dated Jun. 12, 2018 in U.S. Appl. No. 15/418,402, 11 pages.

Non-Final Office Action dated Aug. 24, 2018 in U.S. Appl. No. 15/133,293, 8 pages.

Ayers, P. et al., "Improving ROPS designs for agricultural tractors", University of Tennessee Department of Biosystems Engineering and Soil Science, International Conference RAGUSA SHAW 2012, Sep. 3-6, 2012, Ragusa, Italy, 7 pages.

International Search Report and Written Opinion dated Apr. 22, 2016 for PCT Patent Application No. PCT/US2016/017782, 8 pages.

Non-Final Office Action dated Jul. 29, 2015 in U.S. Appl. No. 14/540,708, 6 pages.

University of Tennessee, Knoxville, Powered Foldable ROPS, Senior Project, Document created May 1, 2009, Publication Date Unknown.

Non-Final Office Action dated Sep. 21, 2016 in U.S. Appl. No. 15/041,718, 8 pages.

PCT International Preliminary Report on Patentability dated Aug. 24, 2017 in International Application No. PCT/US/2016/017782, 7 pages.

Notice of Allowance dated Mar. 21, 2019 in U.S. Appl. No. 15/415,630, 5 pages.

Notice of Allowance dated Jun. 5, 2019 in U.S. Appl. No. 15/133,293, 5 pages.

* cited by examiner

LEVER-ACTUATED OPERATOR PROTECTION APPARATUS

CROSS-REFERENCE TO RELATED APPLICATIONS

This application is a Continuation-in-Part of co-pending U.S. application Ser. No. 15/418,402, filed Jan. 27, 2017, and entitled "Operator Protection Apparatus with an Over-Center Linkage;" U.S. application Ser. No. 15/418,402 is a Continuation of U.S. application Ser. No. 15/041,718 (now U.S. Pat. No. 9,573,548), filed Feb. 11, 2016, also entitled "Operator Protection Apparatus with an Over-Center Linkage," which claims the benefit of U.S. Provisional Application No. 62/115,868, filed Feb. 13, 2015, and entitled "Rollover Protection Apparatus with an Over-Center Mechanism;" the entirety of each is hereby incorporated by reference.

FIELD

Aspects provided relate to an operator protection apparatus for vehicles. More particularly, aspects herein relate to a lever-actuated operator protection apparatus that moves from a raised position to a lowered position and is suitable for use on a number of vehicles, including terrain working vehicles.

BACKGROUND

Some operator or operator protection apparatuses for terrain working vehicles may have a fold-down capability for avoiding overhead obstacles. Traditionally, foldable operator protection apparatuses have included a lower portion in a fixed position and an upper portion that is mounted to the lower portion. Further, many foldable operator protection apparatuses require that an operator physically rotate the upper portion between a raised and a lowered position, which may require that the operator leave the seating platform of the vehicle. Resultantly, efficiencies in the operation performed by the operator may be reduced.

Additionally, previous foldable operator protection apparatuses have used bulky securing devices to secure the upper portion in a raised position. Various securing devices, such as removable pins and the like, have been employed to secure upper portions in a raised position. Further, as can be appreciated, removable securing devices may be lost or misplaced, further decreasing efficiencies of the operator during operations.

SUMMARY

Aspects hereof relate to an operator protection apparatus that can be lowered and raised to a locked position using at least one over-center linkage. The operator protection apparatus includes a lower portion and an upper portion that is movable relative to the lower portion. The upper portion may be coupled to the lower portion with one or more hinge joints. Additionally, the at least one over-center linkage may be pivotably coupled to the upper portion and the lower portion. In some aspects, the over-center linkage includes a lower link assembly and an upper link assembly coupled at a center pivot joint. Additionally, the over-center linkage may be configured to move between the locked position and an unlocked position. When the over-center linkage is in the locked position, the over-center linkage may retain the upper portion in the raised position. Further, the apparatus may include an actuator coupled to the over-center linkage for moving the apparatus between the locked and/or raised position and the unlocked and/or lowered position.

Additional aspects hereof relate to a lever-actuated operator protection apparatus. The lever-actuated operator protection apparatus includes a lower portion, an upper portion, and a hinge joint, which may couple the lower portion and the upper portion such that the upper portion is movable relative to the lower portion. Additionally, the lever-actuated operator protection apparatus includes a lever (e.g., a hand lever) having a first end coupled with the operator protection apparatus. The lever also includes a second end that is positioned forward of the hinge joint, when the upper portion is in a raised position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
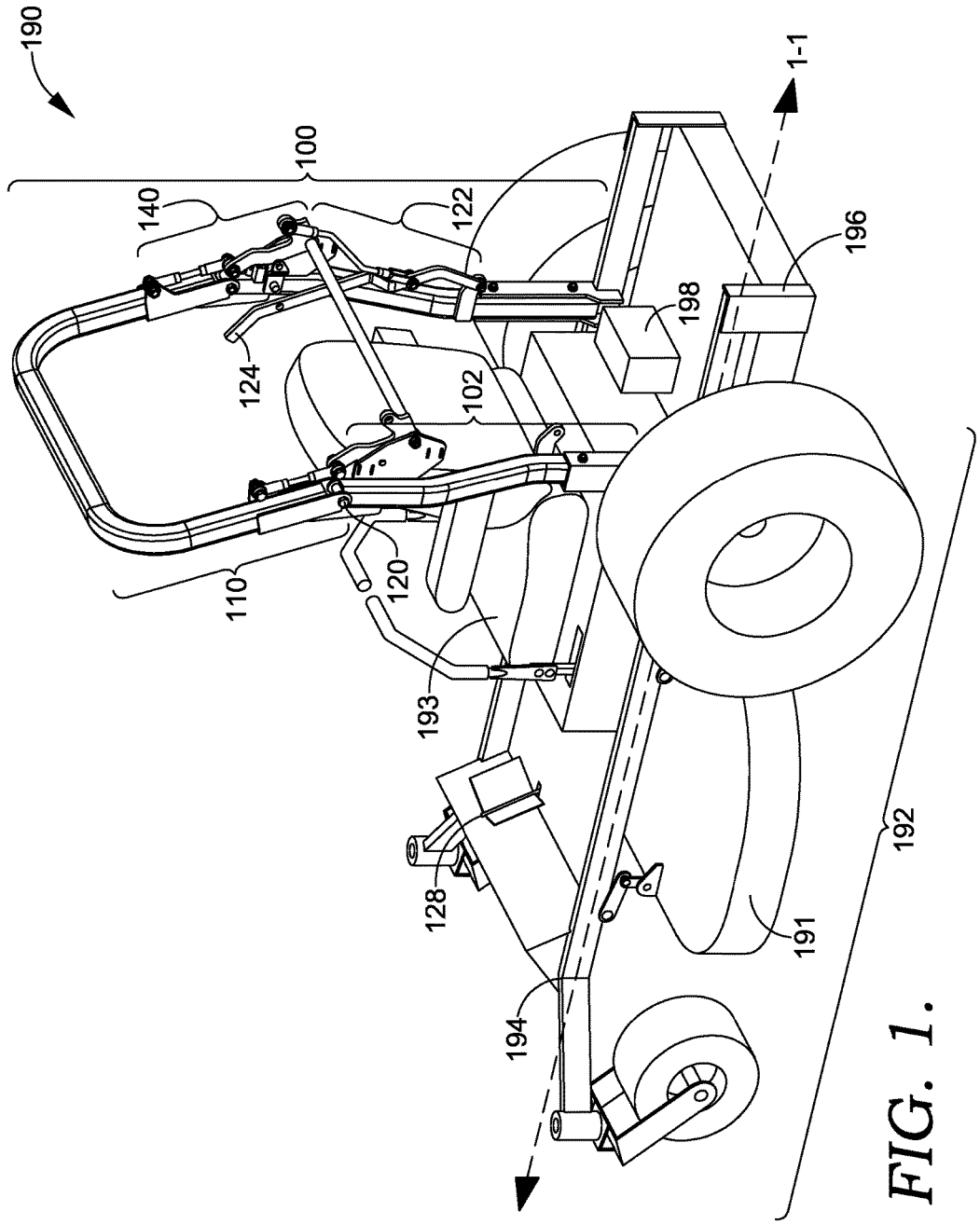
FIG. 1 depicts a riding mower having an operator protection apparatus affixed thereto in a raised position, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Aspects hereof relate to an operator protection apparatus that can be raised and lowered by an operator in a seated position, for example, on a riding mower. Additionally, the operator protection apparatus may lock in the raised position. The movement and locking may be facilitated by an over-center linkage. For example, when an operator raises an upper portion of the operator protection apparatus, a center pivot joint of the over-center linkage may be configured to move to a position past a centerline defined as extending between pivots points at opposing ends of the linkage. Accordingly, a mechanical force is then required to overcome the lock and allow the operator protection apparatus to return to a lowered position.

As a result, an operator may lower the upper portion of the operator protection apparatus, for example to avoid an obstacle, without stopping operation or leaving an operator seat of the vehicle. As can be appreciated, the convenience and ease of use of the operator protection apparatuses described herein may be conducive to improving the frequency of use of the operator protection apparatus. Further, the over-center linkage may provide a securing device that remains attached to the operator protection apparatus. Accordingly, the operator protection apparatuses provided herein may be secured in the raised and/or locked position using a securing device without loose parts. As a result, the apparatuses provided herein may eliminate the need for removable securing mechanisms, which if detached and misplaced, may cause inefficiencies during the operation of a vehicle associated with the operator protection apparatus.

A first exemplary embodiment provides for an operator protection apparatus, the apparatus comprising a lower portion and an upper portion. The lower portion may have a first end and a second end and the upper portion may also have a first end and a second end. The apparatus may also include at least one hinge joint (e.g., pivot) coupling the lower portion second end to the upper portion first end such that the upper portion is movable relative to the lower portion. Stated differently, the upper portion may be pivotably coupled with the lower portion. Further, in some aspects, the apparatus comprises at least one over-center linkage effective to lock the upper portion in a set position (e.g., raised) relative to the lower portion. The over-center linkage comprises a lower link assembly having a first end and a second end, the first end is pivotably coupled to the lower portion at a lower pivot joint. The over-center linkage further comprises an upper link assembly having a first end and a second end, the upper link assembly first end is pivotably coupled to the lower link assembly second end forming a center pivot joint, and the upper link assembly second end is pivotably coupled with the upper portion at an upper pivot joint. Accordingly, the over-center linkage is in a locked position when the center pivot joint is on a first side of a line extending between the lower pivot joint and the upper pivot joint and the center pivot joint is in an unlocked position on a second side of the line. The apparatus may also include at least one actuator coupled to the over-center linkage.

A second exemplary embodiment provides for an operator protection apparatus for a terrain working vehicle. The operator protection apparatus may comprise a lower portion having a first end and a second end, wherein the first end is affixed to a frame of the terrain working vehicle; an upper portion having a first end and a second end; and at least one hinge joint coupling the lower portion second end to the upper portion first end such that the upper portion is movable relative to the lower portion. The operator protection apparatus may include at least one over-center linkage, the at least one over-center linkage comprising: a lower link assembly having a first end and a second end, the first end pivotably coupled to the lower portion at a lower pivot joint; an upper link assembly having a first end and a second end, the upper link assembly first end pivotably coupled to the lower link assembly second end forming a center pivot joint, and the upper link assembly second end pivotably coupled with the upper portion at an upper pivot joint. In one aspect, the over-center linkage is in a locked position when the center pivot joint is on a first side of a line extending between the lower pivot joint and the upper pivot joint and the center pivot joint is in an unlocked position on a second side of the line. The operator protection apparatus may also include at least one actuator coupled to the over-center linkage.

Yet another exemplary embodiment provides for a riding mower having an operator protection apparatus. The riding mower may comprise a frame; a mower deck coupled to the frame; and an operator protection apparatus. The apparatus may comprise: a lower portion comprising a first lower portion upright having a first upright first end and a first upright second end, and a second lower portion upright having a second upright first end and a second upright second end. The apparatus may additionally comprise an upper portion comprising a first upper portion member having a first member first end and a first member second end, a second upper portion member having a second member first end and a second member second end, and a transverse member disposed between the first member second end and the second member second end. The apparatus may also include a pair of hinge joints coupling the first upright second end to the first member first end and the second upright second end to the second member first end such that the upper portion is movable relative to the lower portion. Further, the apparatus comprises a first over-center linkage, the first over-center linkage comprising: a first lower link assembly having a first lower link first end and a first lower link second end, wherein the first lower link first end is pivotably coupled to the first lower portion upright at a first lower link pivot joint; a first upper link assembly having a first upper link first end and a first upper link second end, wherein the first upper link assembly first end is pivotably coupled to the first lower link assembly second end at a first center pivot joint. In one aspect, the first over-center linkage is in a locked position when the first center pivot joint is on a first side of a first line extending between the first lower link pivot joint and the first upper link pivot joint, and the first over-center linkage is in an unlocked position when the first center pivot joint is on a second side of the first line. The operator protection apparatus may also include a first actuator coupled to the first over-center linkage at a first actuator-over-center pivot joint and coupled to the first lower portion upright at a first actuator-upright pivot joint for moving the upper portion between locked position and the unlocked positon. The riding mower may also include a controller for controlling one or more operations of the riding mower; and one or more sensors communicatively coupled to the controller.

FIG. 1 depicts an exemplary aspect of an operator protection apparatus 100 mounted on a riding mower 190, in accordance with aspects hereof. In some aspects, the riding mower may include a mower deck 191 coupled to the frame 192 and a controller 198. The riding mower 190 may also comprise a frame 192 having a frame first end 194 and a frame second end 196. In one aspect herein, a horizontal line 1-1 extending from the frame first end 194 to the frame second end 196 defines a horizontal plane, which may be referred to herein in order to describe locations and positions of various components of the operator protection apparatuses described herein. The mower 190 of FIG. 1 is exemplary in nature. It is contemplated that the operator protection apparatus of provided herein may be associated with any vehicle having an occupant. Nonlimiting examples of vehicles with which the operator protection apparatus may be associated include terrain working vehicles, lawn tractors, UTVs, ATVs, compact tractors, and loaders.

The operator protection apparatus 100 may include a lower portion 102 and an upper portion 110. In some aspects, the lower portion 102 may comprise a pair of mirror-image lower portion 102 uprights. Accordingly, the lower portion 102 may be described herein as comprising the pair of lower portion 102 uprights. The lower portion 102 may be affixed to or integrally formed with a frame of any number of vehicles. Similarly, the upper portion 110 may include a pair of mirror-image upper portion members and a transverse member affixed between the upper portion members. Accordingly, the upper portion 110 may be described herein as comprising the upper portion members and the transverse member. However, as will be provided hereinafter, alternative configurations are contemplated while achieving the aspects provided for the operator protection apparatus 100.

Further, the operator protection apparatus 100 may comprise at least one hinge joint 120 for coupling the lower portion 102 to the upper portion 110 and at least one over-center linkage 140. The over-center linkage 140 may be pivotably coupled to the lower portion 102 and the upper portion 110. Further, the over-center linkage 140 may be movable between a locked and an unlocked position. In one example, when in the locked position, the over-center linkage 140 may provide a mechanical stop to prevent back-driving of the operator protection apparatus 100, in order to keep the operator protection apparatus 100 in a raised position.

Figure 2:
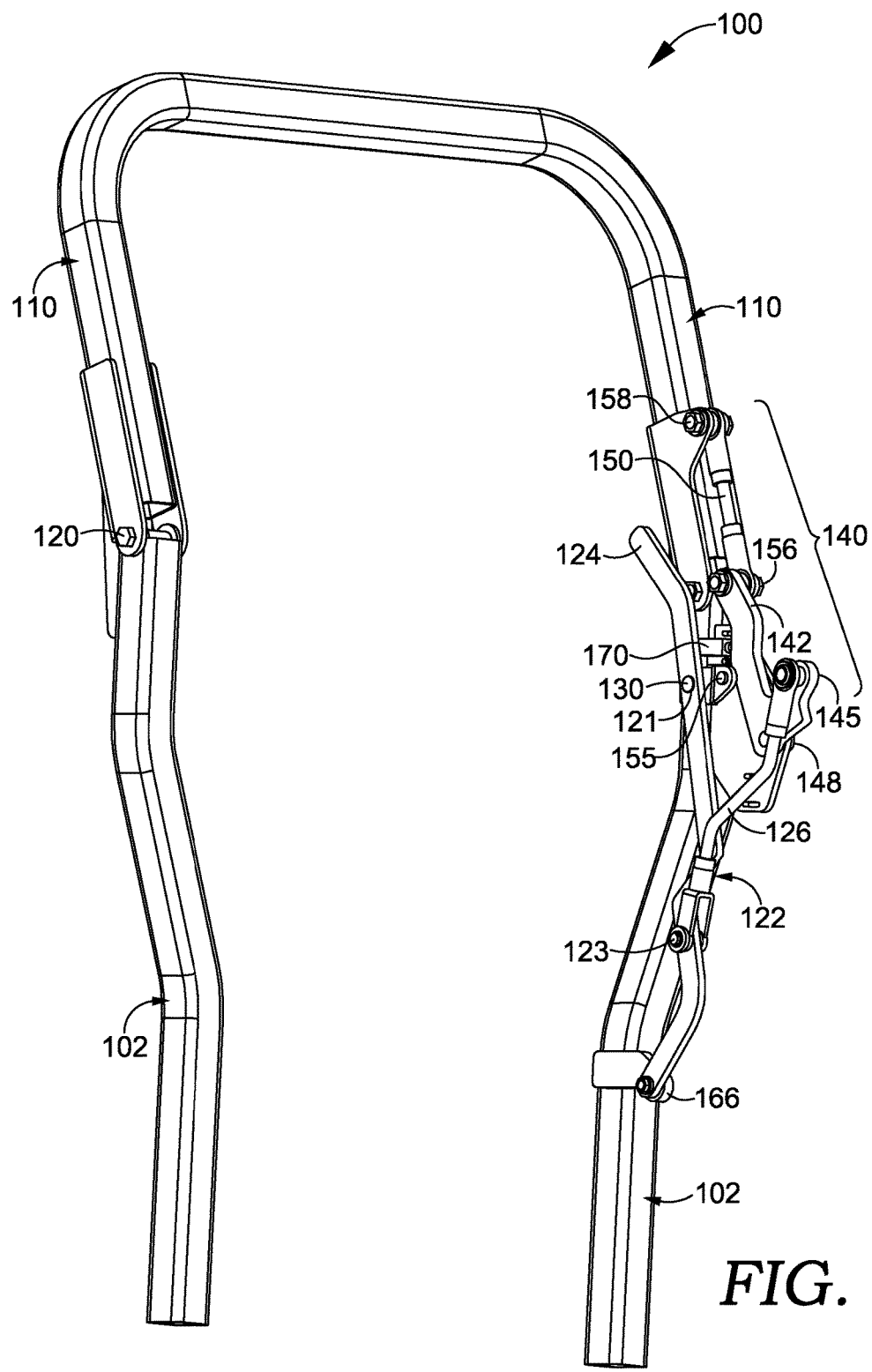
FIG. 2 depicts a perspective view of an operator protection apparatus having an over-center linkage in a raised position, in accordance with aspects hereof.

FIG. 2 depicts a perspective view of one embodiment of the operator protection apparatus 100 having at least one over-center linkage 140, in accordance with aspects hereof. The operator protection apparatus 100 may include a lower portion 102 and an upper portion 110. Additionally, the operator protection apparatus 100 may include at least one over-center linkage 140. In some aspects, the over-center linkage 140 may include a lower link assembly 142 pivotably coupled to the lower portion 102 at a lower pivot joint 148. Further, the over-center linkage 140 may include an upper link assembly 150 pivotably coupled to the lower link assembly 142 at a center pivot joint 156. Additionally, the upper link assembly 150 may be pivotably coupled with the upper portion 110 at an upper pivot joint 158. Any of the links, members, or other elements may be adjustable in orientation and/or length to achieve aspects provided herein. For example, the upper link assembly 150 may be an opposing threaded screw link allowing for a rotational movement to adjust the length of the link.

Further, the operator protection apparatus 100 may include a stop lug 155 for limiting movement of the over-center linkage 140 beyond the locked position. In one aspect, the stop lug 155 may be affixed to the lower portion 102 (for example via a bracket) such that the lower link assembly 142 contacts the stop lug 155 when the over-center linkage 140 is in the locked position. In other aspects, the stop lug 155 may be affixed to the upper portion 110. The stop lug 155 is one example of a mechanism for limiting movement of the over-center linkage 140 beyond the locked position. Other structures and mechanisms for limiting movement of the over-center linkage 140 may also be employed. In an additional aspect, the stop lug 155, or other stopping mechanism, may be associated with the over-center linkage 140. For example, the stop lug 155 may be affixed to the over-center linkage 140 such that the stop lug 155 contacts the surface of the lower portion 102 and/or the upper portion 110. Additionally, one or more pivot joints associated with the over-center linkage 140 (for example, lower pivot joint 148, upper pivot joint 158, and center pivot joint 156) may be limited pivot joints, such that the joints include a limiter for limiting rotation past the locked position.

Additionally, the operator protection apparatus 100 may include at least one actuator 122 coupled to the over-center linkage 140. The actuator 122 may generally operate to articulate the over-center linkage 140 between the locked position and the unlocked positon. In some aspects, once the actuator 122 has moved the over-center linkage 140 to the unlocked position, the actuator 122 may provide a force required to move the upper portion 110 to the lowered position and return the upper portion 110 to the a raised and/or locked position. Although shown here as a hand lever 124, the actuator 122 may be a powered actuator, such as an electric, pneumatic, hydraulic, or mechanical actuator. Several examples of actuators are described below, however any suitable mechanism for performing the actuation is considered within the scope of this disclosure.

Additionally, the apparatus may comprise at least one securing device 130 associated with the over-center linkage 140 and permanently affixed to the apparatus. In one aspect, the securing device 130 may include a projection for engaging a securing device engagement aperture 121 of the hand lever 124. In one example, the projection may be spring-loaded, such that when the projection is aligned with a securing device engagement aperture 121, the hand lever 124 is secured. Further, the securing device 130 may include a sensor for detecting an engagement of the securing device 130. In some aspects, the sensor may be integrated with the securing device 130, or may be associated with the securing device 130. Any number of securing devices may be suitable for securing the actuator 122. At a high level, the securing device 130 retains the actuator 122, such that the actuator 122 ensures the over-center linkage 140 remains in the locked position.

In one aspect, the operator protection apparatus 100 includes a position sensor 170. The position sensor 170 may be configured to detect one or more positions of the operator protection apparatus 100. For example, the sensor may be configured to detect when the operator protection apparatus 100 is in a locked position. In additional aspects, the position sensor 170 may be detect when the operator protection apparatus 100 is in the raised position, but is not in the locked position. In one aspect, a position sensor 170 may include a projection that is depressed when the over-center linkage 140 is in the locked position. Further, in some aspects of the position sensor 170 may be configured to communicate the one or more positions, for example to a controller 198 (described in more detail below). Accordingly, a time that the operator protection apparatus 100 is in each position of the one or more positions may be determined using the sensed information detected by the position sensor 170.

Figure 3:
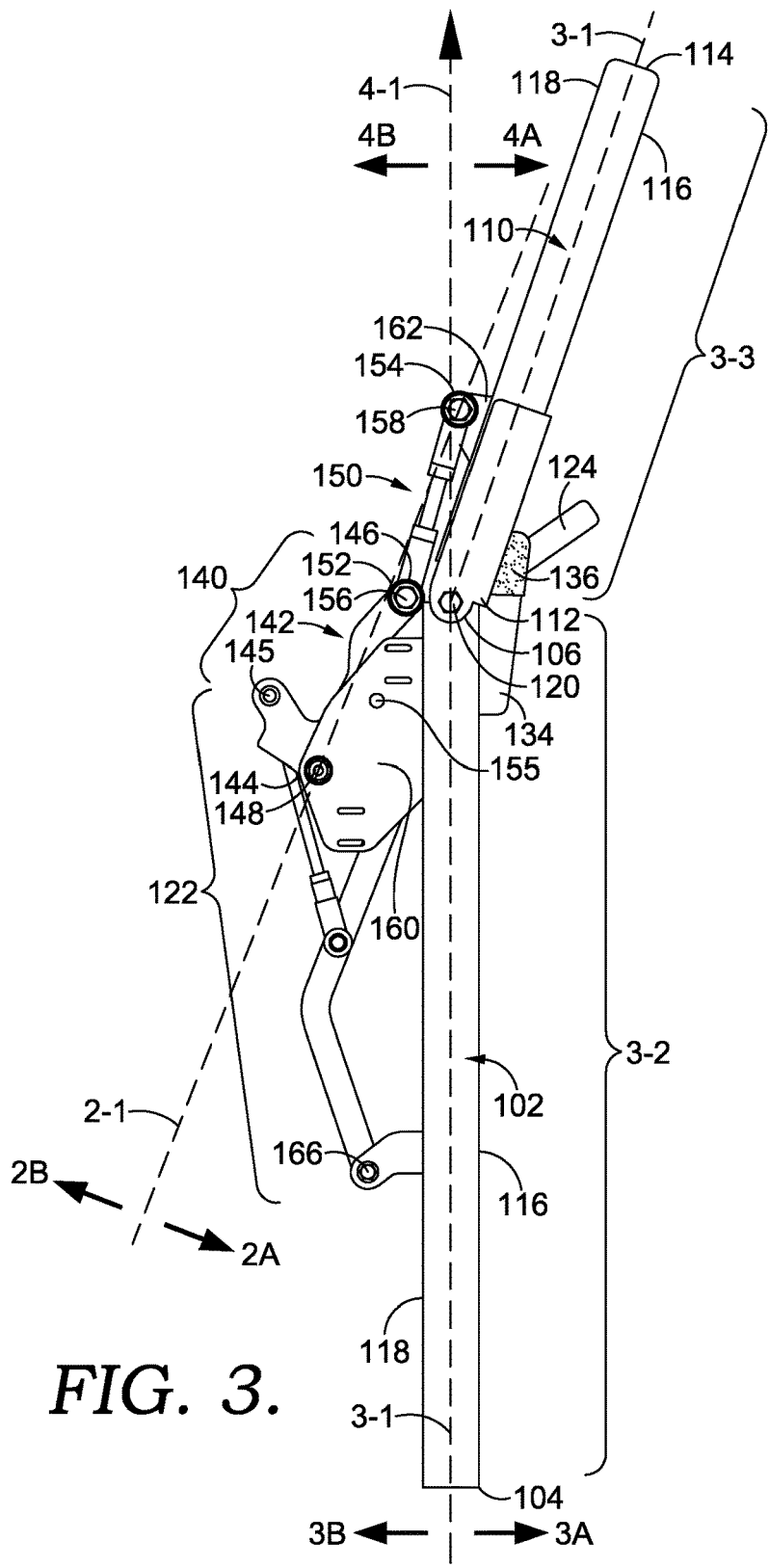
FIG. 3 depicts a side view of the operator protection apparatus of FIG. 2 in the raised position, in accordance with aspects hereof.

As shown in FIG. 3, the lower portion 102 may comprise a lower portion first end 104 and a lower portion second end 106. The lower portion first end 104 may be welded to (or fastened using any number of means), or may be integrally formed with a frame of a vehicle. Accordingly, the term "end," as used herein, does not necessarily indicate a point at which a given component terminates. For example, the lower portion first end 104 may be contiguous with the frame of the vehicle. The upper portion 110 may include an upper portion first end 112 and an upper portion second end 114. The operator protection apparatus 100 may also include at least one hinge joint 120, as described above. In one aspect, the at least one hinge joint 120 may couple the lower portion second end 106 to the upper portion first end 112, such that the upper portion 110 is movable relative to the lower portion 102.

The over-center linkage 140 may include the lower link assembly 142 having a lower link first end 144 and a lower link second end 146. The lower link first end may be pivotably coupled to the lower portion 102 at the lower pivot joint 148. Further, the over-center linkage 140 may include an upper link assembly 150 having an upper link first end 152 and an upper link second end 154. The upper link first end 152 may be pivotably coupled to the lower link second end 146 to form a center pivot joint 156. Additionally, the upper link assembly second end may be pivotably coupled with the upper portion 110 at an upper pivot joint 158.

Figure 5:
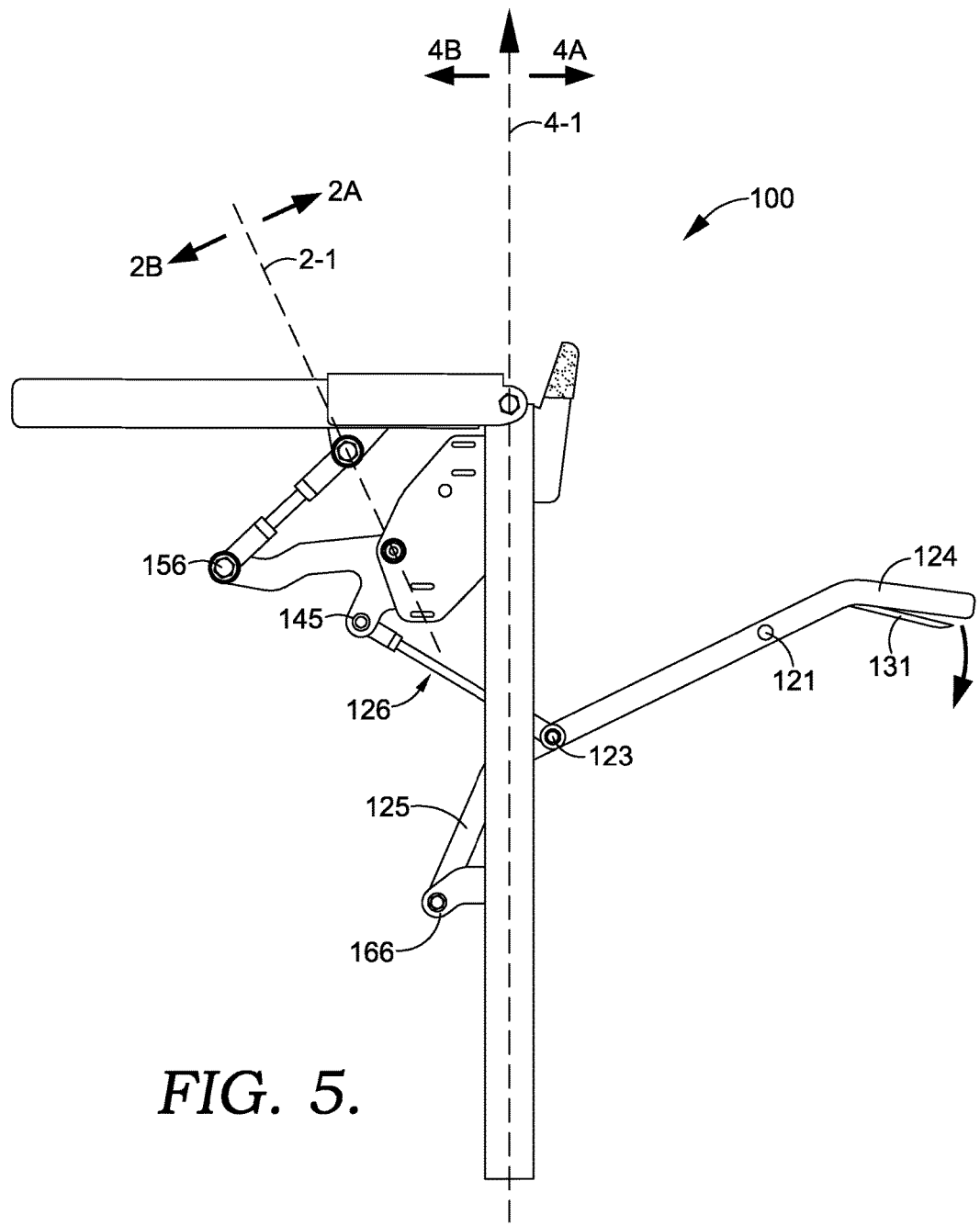
FIG. 5 depicts a perspective view of the operator protection apparatus of FIG. 2 in a lowered position, in accordance with aspects hereof.

Turning now to more particular aspects, the over-center linkage 140 may include a centerline 2-1 extending between the lower pivot joint 148 and the upper pivot joint 158. The centerline 2-1 may include a first side 2A and a second side 2B. The over-center linkage 140 may be in a locked position when the center pivot joint 156 is on the first side 2-1 of centerline 2-1. Accordingly, the over-center linkage 140 may be in an unlocked position (as shown in FIG. 5) when the center pivot joint 156 is on the second side 2B of the centerline 2-1. As can be appreciated, in alternative configurations the over-center linkage 140 may be oriented and positioned such that the over-center linkage 140 is configured to be in the locked position in a variety of directions. Such alternative configurations are considered within the scope of this disclosure.

Further, when the over-center linkage 140 is in the locked position, the over-center linkage 140 may provide a mechanical stop to prevent back-driving of the mechanism. In some aspects, the movement of the center pivot joint 156 in the direction of the first side may be limited, for example, such by the stop lug 155. In other aspects, the center pivot joint 156 may be limited by the lower portion 102 and the upper portion 110, or by a center pivot joint 156 that limits rotation in the direction of the first side.

The operator protection apparatus 100 may be described as having a midline 3-1. The midline 3-1 of the operator protection apparatus 100 may have a first midline line segment 3-2 extending from the lower portion first end 104 to the hinge joint 120 and a second midline line segment 3-3 extending from the hinge joint 120 to the upper portion second end 114. Accordingly, the midline 3-1 may define a midline first side 3A and a midline second side 3B. Further, a lower portion ray 4-1 may extend from the lower portion first end 104 through the hinge joint 120. Said another way, the lower portion ray 4-1 may be an extension of first midline line segment 3-2. Further, the lower portion ray 4-1 may have a lower portion ray first side 4A and a lower portion ray second side 4B. Accordingly, the operator protection apparatus 100 may be described as having first side 116 and a second side 118 opposite the front side 116. The first side 116 of the operator protection apparatus 100 may be oriented in the same direction as midline first side 3A, and the second side 118 may be oriented in the same direction as midline second side 3B.

In some aspects, the operator protection apparatus 100 may include a stop 134 associated with at least one of the upper portion 110 and the lower portion 102. The stop 134 limits a range of motion of the upper portion 110 in a radial direction toward the lower portion ray first side 4A. The stop 134 may be affixed to the operator protection apparatus 100 first side 118 proximate the upper portion second end 114, and extend, at least in part, beyond the upper portion second end 114. Accordingly, when the operator protection apparatus 100 is in a locked position, the upper portion may contact the stop 134. In some aspects, the stop 134 may include a bumper 136. The bumper 136 may be any suitable material for dampening contact forces with the stop 134, such as a polymer based material. Further, because the range of motion of the upper portion 110 is limited, a range of motion of the center pivot joint 156 of the over-center linkage 140 may also be limited, for example, by coming in contact with the lower portion 102 and/or the upper portion 110. Additionally, as discussed hereinabove, the stop lug 155, or other mechanism, may limit movement of the over-center linkage 140 beyond the locked position.

In some aspects, the lower link assembly 142 may be coupled to the lower portion 102 by a lower portion bracket 160 and the upper link assembly 150 may be coupled to the upper portion 110 by an upper portion bracket 162. The lower portion bracket 160 and upper portion bracket 162 may be welded (or fastened using any number of means), or may be integrally formed with the upper portion 110 and the lower portion 102. In some aspects, the lower portion bracket 160 and upper portion bracket 162 may each be offset from the lower portion 102 and the upper portion 110. For example, each of the lower portion bracket 160 and the upper portion bracket 162 may extend outwardly from the second side 118 of the operator protection apparatus 100. In some aspects, the lower portion bracket 160 may extend further outward from the second side 118 than the upper portion bracket 162. As a result, the lower pivot joint 148 may be positioned on the lower portion ray second side 4B and the upper pivot joint 158 may be positioned (at least in part) on the lower portion ray first side 4A. Accordingly, the over-center linkage 140 may provide a mechanical advantage for retaining the operator protection apparatus 100 in a locked position, in that the center pivot joint 156 is biased toward the lower portion ray 4-1 when the operator protection apparatus 100 is in a raised and/or locked position.

Figure 4:
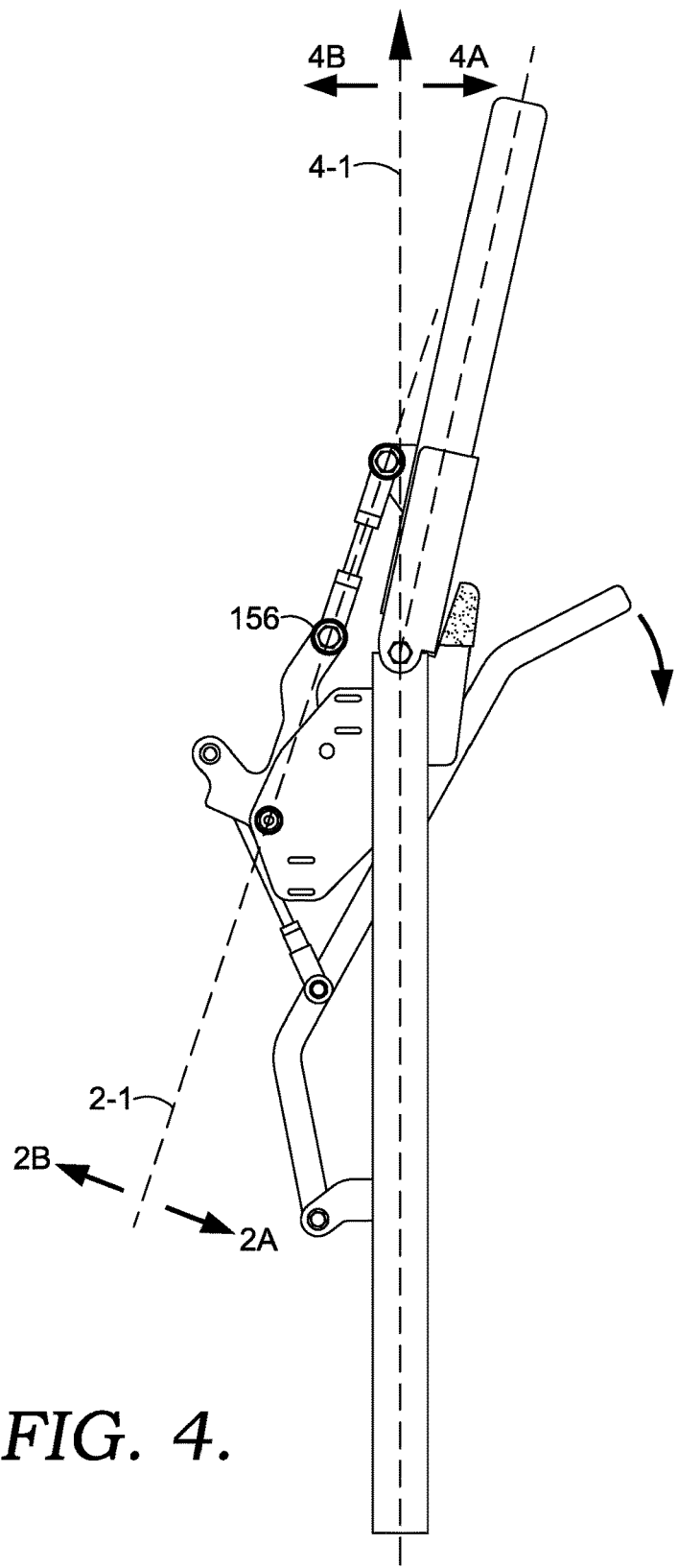
FIG. 4 depicts a side view of the operator protection apparatus of FIG. 2 in a top dead center position, in accordance with aspects hereof.

Turning now to FIG. 4, the over-center linkage 140 is shown in a top dead center position, in accordance with aspects hereof. The center pivot joint 156 may be positioned directly along centerline 2-1 when in the top dead center position. Said another way, the center pivot joint 156 is neither on the first side 2A, nor on the second side 2B of the centerline 2-1 when in the top dead center position. Accordingly, FIG. 4 depicts a break over point, or a point at which the over-center linkage 140 is no longer in the locked position. In one example, the over-center linkage may be moved to this position by the actuator 122, which supplies the force required to overcome the lock provided by the over-center linkage 140.

FIG. 5 depicts the operator protection apparatus 100 in a lowered position. As shown, the over-center linkage 140 is in the unlocked position, in that the center pivot joint 156 is on the second side 2B of the centerline 2-1. Additionally, the upper portion 110 is positioned on the lower portion ray second side 4B of lower portion ray 4-1. As described above, in one aspect, the actuator 122 comprises the hand lever 124. The hand lever 124 may include a hand lever pivot joint 123 coupled to a hand-lever actuator linkage 126 that extends from the hand lever 124 to an actuator-over-center pivot joint 145. Accordingly, a hand lever lower portion 125 may extend from a actuator-lower portion pivot joint 166 to the hand lever pivot joint 123. In some aspects, the hand lever 124 includes a trigger 131 that is configured to disengage the securing device 130, thereby allowing the operator protection apparatus 100 to be lowered.

Figure 7:
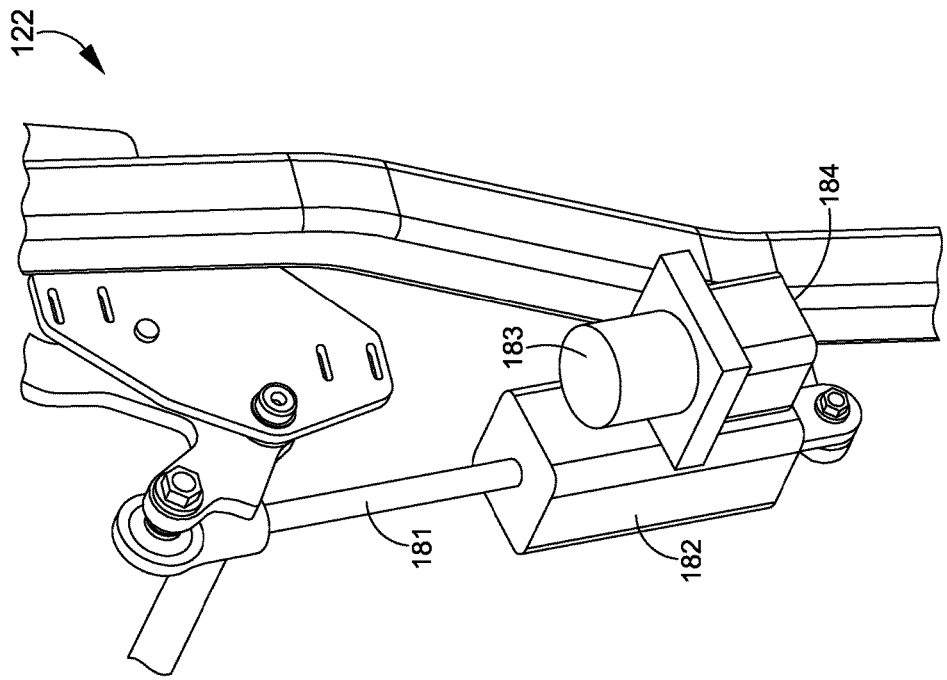
FIG. 7 depicts a perspective view of an exemplary electric-hydraulic actuator, in accordance with aspects hereof.
Figure 6:
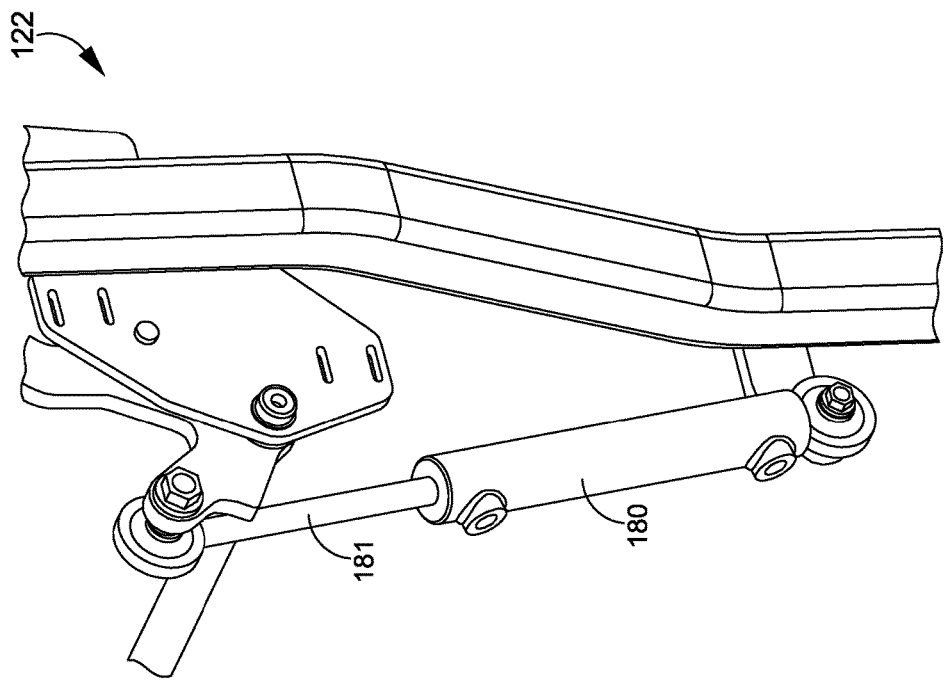
FIG. 6 depicts a perspective view of an exemplary powered actuator, in accordance with aspects hereof.

As mentioned above, any number of suitable actuators 340 may be employed in place of or in conjunction with the hand lever 124. For example, as depicted in FIG. 6, the actuator 122 may comprise a powered actuator 240, such as a hydraulic actuator 180. The operator protection apparatus 100 may be associated with a vehicle equipped with a hydraulic system. In one aspect, the hydraulic actuator may be powered by the hydraulic system of the vehicle. Additionally, as shown in FIG. 7, the actuator 122 may be an electric-hydraulic actuator 182. For example, the electric-hydraulic actuator may include an electric motor 183 that turns a pump 184. The electric-hydraulic actuator 182 may include a switch that turns the motor 183 on and off and controls the direction of the motor 183. The direction in which the motor 183 turns may determine whether a cylinder 181 of the actuator is extended for retracted. For example, when the motor 183 turns in a first direction, the pump 184 pumps fluid such that the cylinder 181 is extended. Accordingly, when the motor 183 turns in a second direction, opposite of the first direction, the fluid is pumped in an opposite direction such that the cylinder 181 is retracted.

Figure 9:
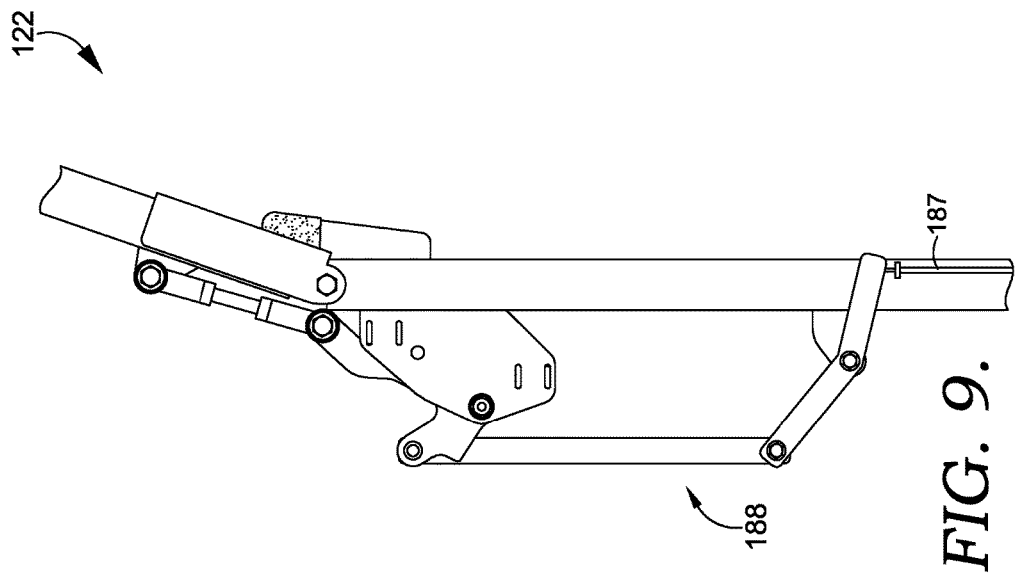
FIG. 9 depicts a perspective view of an mechanical actuator, in accordance with aspects hereof.
Figure 8:
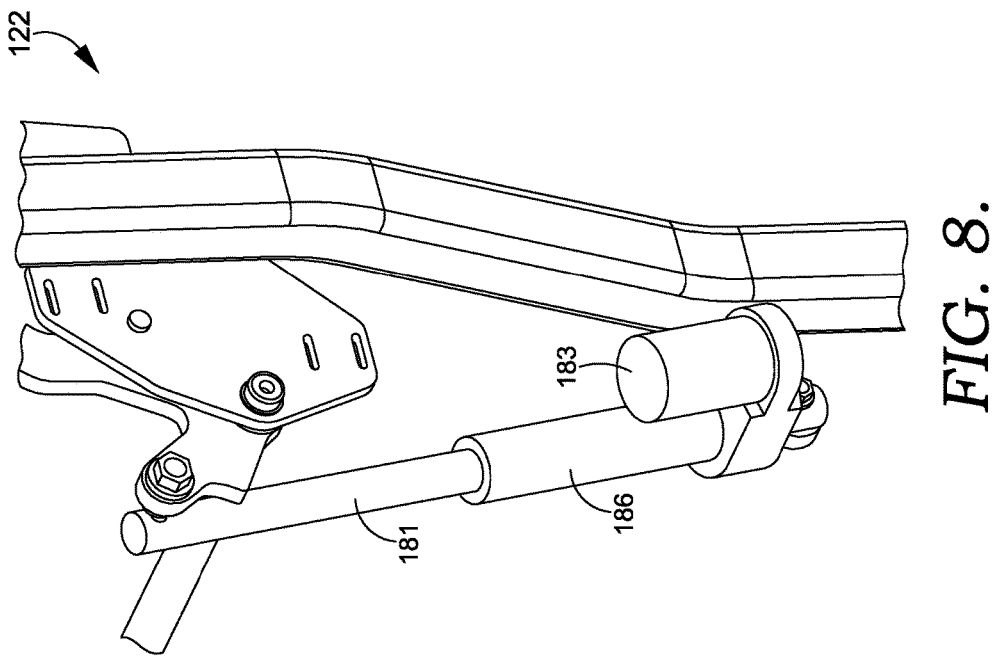
FIG. 8 depicts a perspective view of an exemplary electric actuator, in accordance with aspects hereof.

Further, as shown in FIG. 8, an electric-linear actuator 186 may be implemented. The electric-linear actuator 186 may include a motor 183 that turns a gear reduction set, which turns a screw thread. Accordingly, the cylinder 181 extends and retracts based on which direction the motor 183 turns. In an additional aspect, as shown in FIG. 9, the actuator may include a mechanical linkage 188. In one example, the mechanical linkage 188 may be connected to a foot pedal 128 (shown in FIG. 1) by a cable 187. The foot pedal 128 may have a first side and a second side that rotate about a pivot such that both sides of the foot pedal 128 may be depressed by an operator. In one aspect, when the first side of the pedal 128 is pushed the cable 187 may be extended, thereby urging the mechanical linkage 188 in a direction that disengages the over-center linkage 140. Accordingly, when the second side of the foot pedal 128 is depressed, the cable 187 may be retracted, thereby causing the mechanical linkage 188 to pull the over-center linkage 140 toward the raised position.

Figure 10:
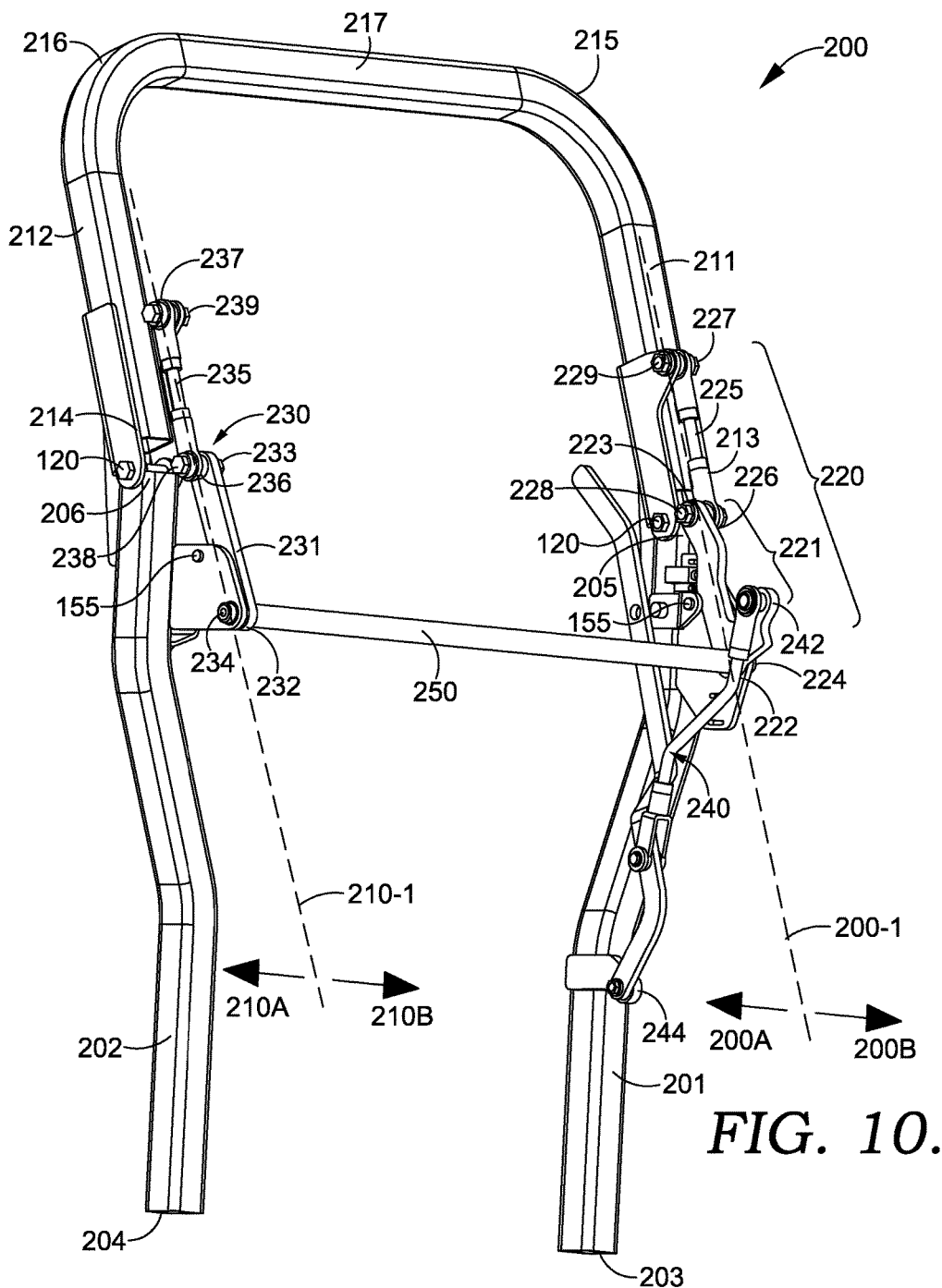
FIG. 10 depicts a perspective view of an operator protection apparatus having two over-center linkages in a raised position, in accordance with aspects hereof.

Turning now to FIG. 10, in another exemplary embodiment, an operator protection apparatus 200 having two over-center linkages is depicted. The operator protection apparatus 200 may include a lower portion 201 comprising a first lower portion upright 201 and a second lower portion upright 202. The first lower portion upright 201 may have a first upright first end 203 and a first upright second end 205. The second lower portion upright 202 may have a second upright first end 204 and a second upright second end 206. In one aspect, the first upright first end 203 and the second upright first end 204 may be affixed to a frame of a terrain working vehicle, for example, a riding mower.

Additionally, the upper portion 210 may comprise a first upper portion member 211 and a second upper portion member 212. The first upper portion member 211 may have a first member first end 213 and a first member second end 215. The second upper portion member 212 may have a second member first end 214 and a second member second end 216. Further, the upper portion 210 may comprise a transverse member 217 disposed between the first member second end 215 and the second member second end 216. While the first upper portion member 211 and the second upper portion member 212 are discussed as distinct members, it is contemplated that they form a continuous and contiguous assembly as a common component or assembly. Further, the operator protection apparatus may have a pair of hinge joints 120 coupling the first upright second end 205 to the first member first end 213 and the second upright second end 206 to the second member first end 214, such that the upper portion 210 is movable relative to the lower portion 201.

Additionally, in some aspects, the operator protection apparatus 200 may include a first over-center linkage 220. The first over-center linkage 220 may comprise a first lower link assembly 221 having a first lower link first end 222 and a first lower link second end 223. The first lower link first end 222 may be pivotably coupled to the first lower portion upright 201 at a first lower link pivot joint 224. The first over-center linkage 220 may also comprise a first upper link assembly 225 having a first upper link first end 226 and a first upper link second end 227. The first upper link assembly 225 first end may be pivotably coupled to the first lower link second end 223 at a first center pivot joint 228. Further, the first upper link second end 227 may be pivotably coupled to the first upper portion member 211 at a first upper pivot joint 229.

Further, in some aspects, the operator protection apparatus 200 comprises a second over-center linkage 230. The second over-center linkage 230 may comprise a second lower link assembly 231 having a second lower link first end 232 and a second lower link second end 233. The second lower link first end 232 may be pivotably coupled to the second lower portion upright 202 at a second lower link pivot joint 234. The second over-center linkage 230 may also comprise a second upper link assembly 235 having a second upper link first end 236 and a second upper link second end 237. The second upper link assembly 235 first end may be pivotably coupled to the second lower link second end 233 at a second center pivot joint 238. Further, the second upper link second end 237 may be pivotably coupled with the second upper portion member 212 at a second upper pivot joint 239.

Similar to the over-center linkage 140 described hereinabove, the first over-center linkage 220 may be in a locked position when the first center pivot joint 228 is on a first centerline first side 200A of a first centerline 200-1 extending between the first lower link pivot joint 224 and the first upper link pivot joint 229. Accordingly, the second over-center linkage 230 may be in a locked position when the second center pivot joint 238 is on a second centerline first side 210A of a second centerline 210-1 extending between the second lower link pivot joint 234 and the second upper pivot joint 239.

In one aspect, the operator protection apparatus 200 comprises a first actuator 240 for moving the first over-center linkage 220 between the locked position and an unlocked positon. The first actuator 240 may be coupled to the first over-center linkage 220 at a first actuator-over-center pivot joint 242 and coupled to the lower portion 201 of the upright at a first actuator-upright pivot joint 244. In some aspects, the apparatus includes a torque tube 250 (which may be referred to as a rod) affixed between the over-center linkages 220 and 230. The torque tube 250 may transfer the rotational force supplied by the actuator 240 from the first over-center linkage 220 to the second over-center linkage 230. As a result, the second over-center linkage 230 may be moved from the locked position to the unlocked position simultaneously with the first over-center linkage 220.

Figure 11:
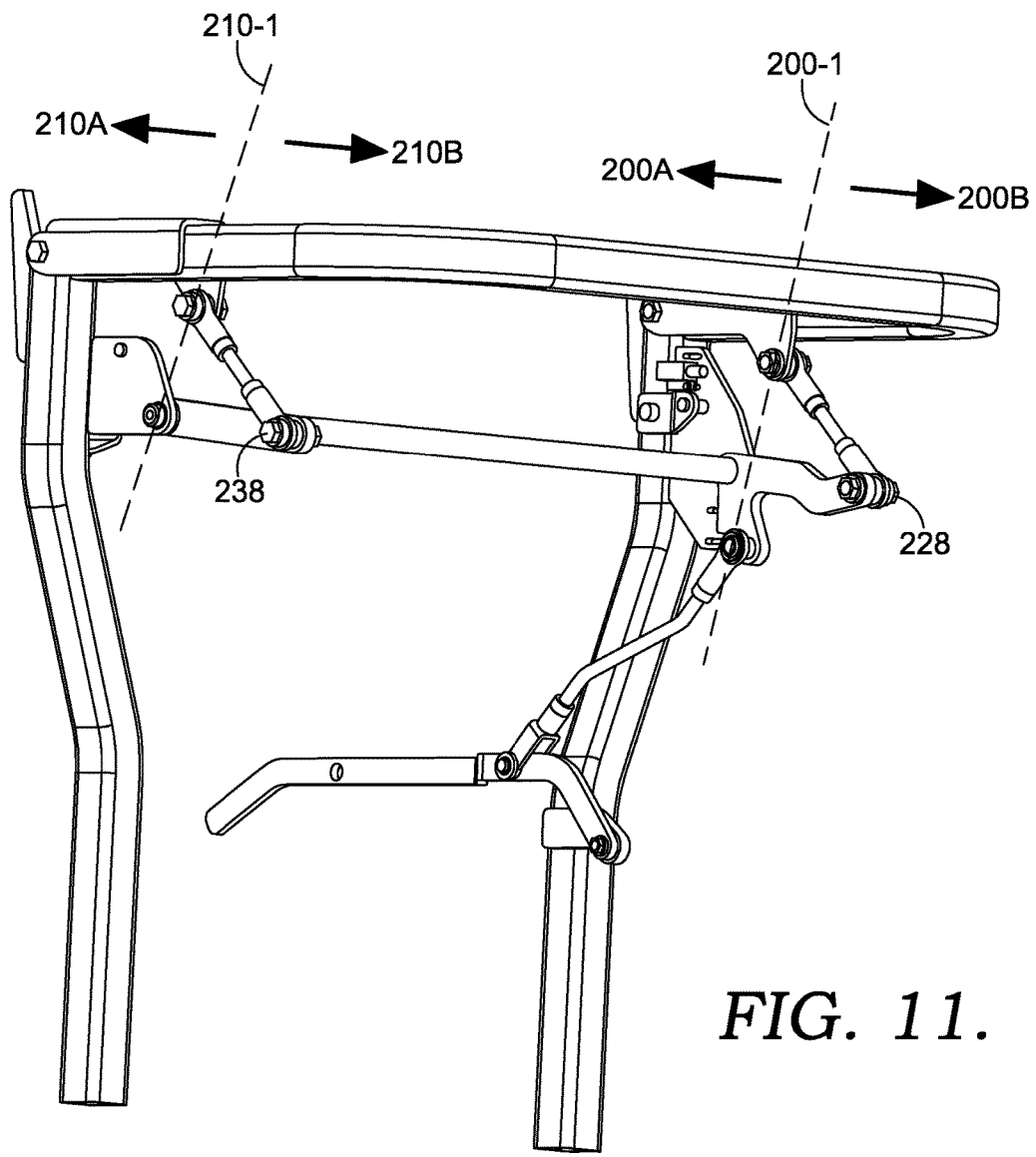
FIG. 11 depicts a perspective of the operator protection apparatus of FIG. 10 in a lowered position, in accordance with aspects hereof.

FIG. 11 depicts the operator protection apparatus 200 and an unlocked/lowered position, in accordance with aspects hereof. The first over-center linkage 220 may be in the unlocked position when the first center pivot joint 228 on a first centerline second side 200B of the first centerline 200-1. Accordingly, the second over-center linkage 230 is in the unlocked position when the second center pivot joint 238 on a second centerline second side 210B of the second centerline 210-1.

Figure 12:
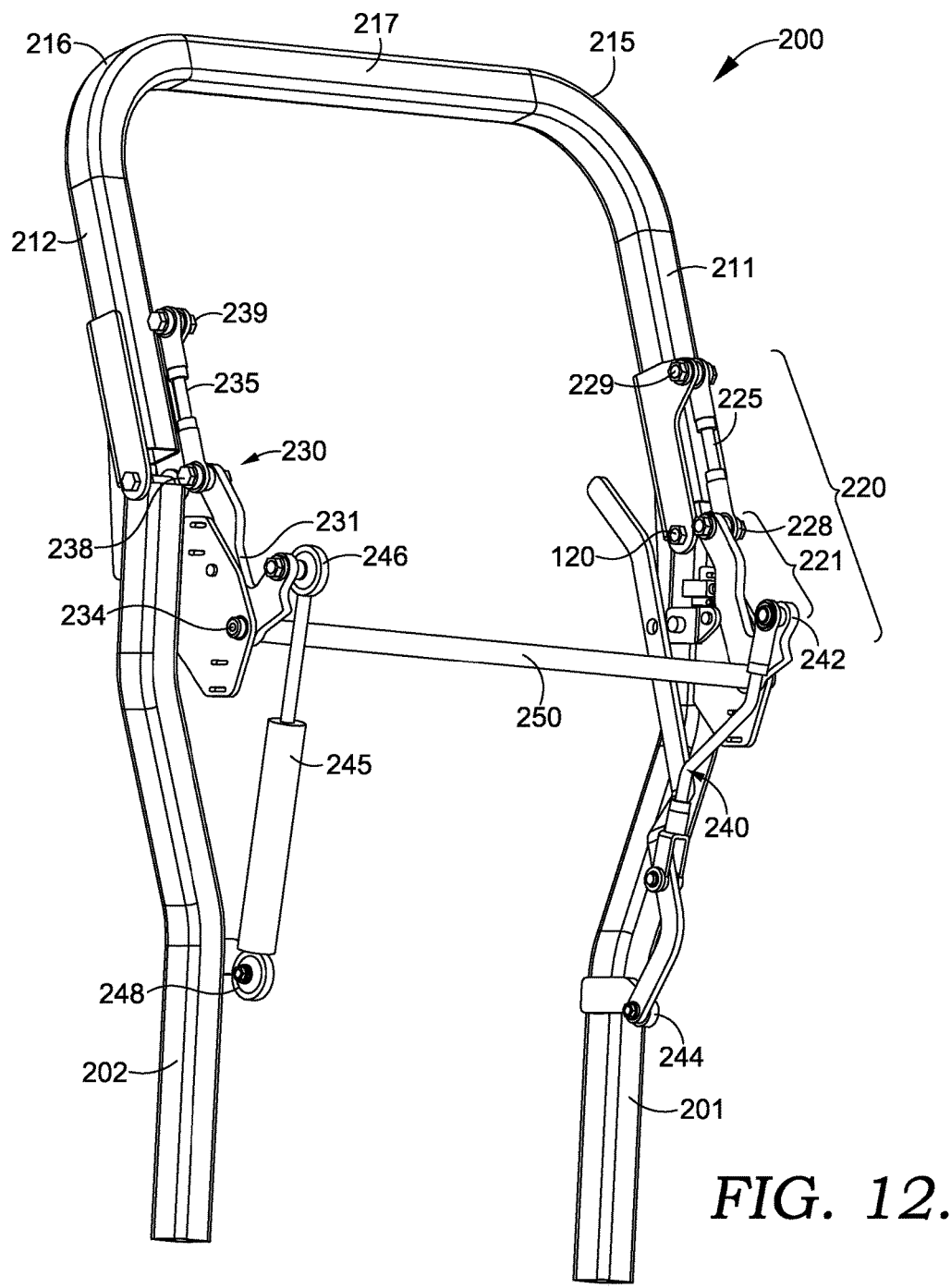
FIG. 12 depicts a perspective view of an operator protection apparatus with an assist in a raised position, in accordance with aspects hereof.

Turning now to FIG. 12, in one aspect, the operator protection apparatus 200 may comprise a gas cylinder 245 coupled to the second over-center linkage 230 at a second actuator-over-center pivot joint 246 and coupled to the second lower portion upright 202 at a second actuator-upright pivot joint 248, in accordance with aspects hereof. The gas cylinder 245 may function as a biasing mechanism or an assist for retaining the second over-center linkage 230 in the locked position. Additionally, the gas cylinder 245 may support and/or compensate for the weight of the upper portion 210 as the upper portion 210 rotates from the raised position to the lowered position. Although shown as a gas cylinder 245 in FIG. 12, other suitable mechanisms (e.g., coil spring, torsion spring, torsion bar) are considered within the scope of this disclosure.

Figure 13:
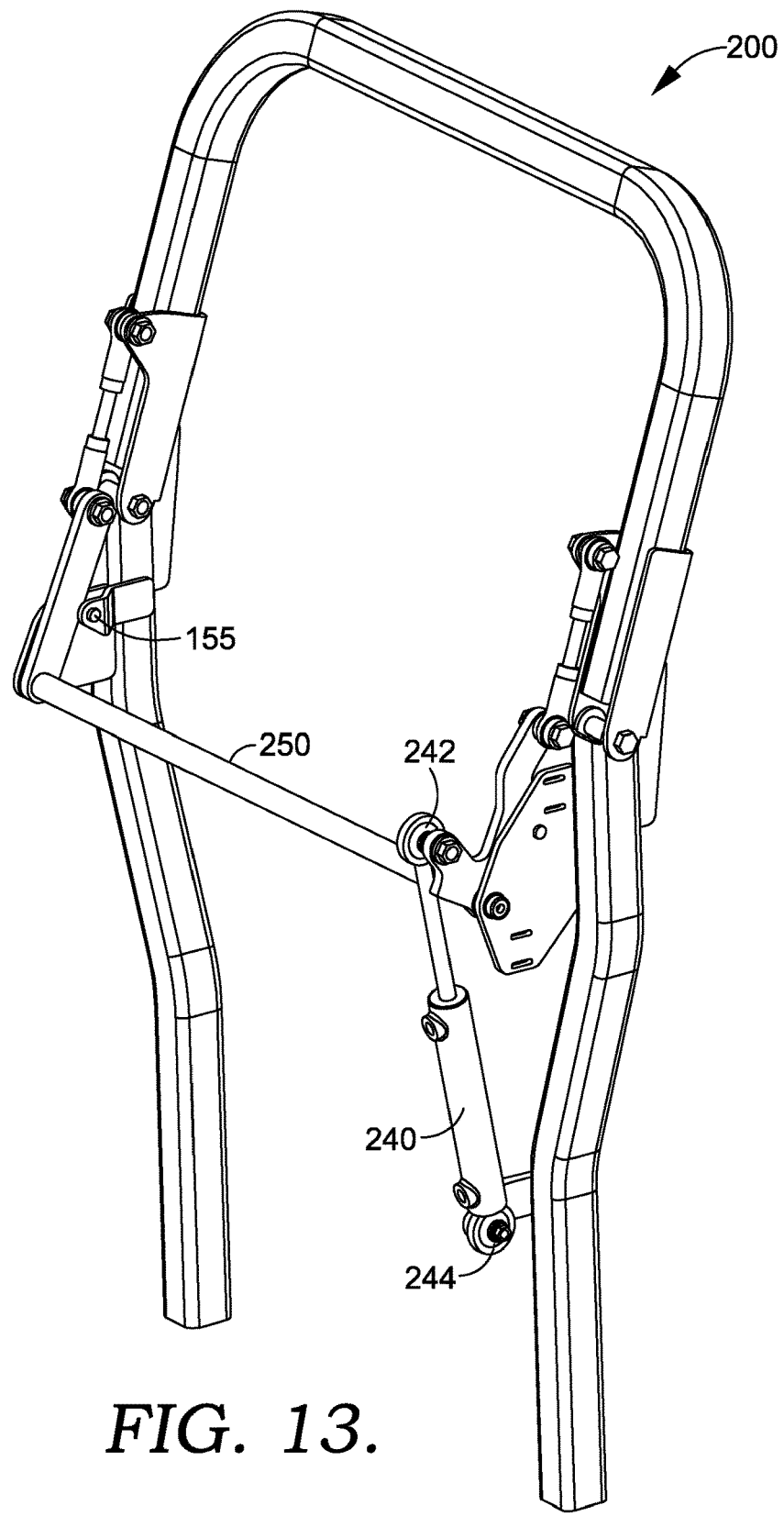
FIG. 13 depicts an alternative perspective view of an operator protection apparatus in a raised position, in accordance with aspects hereof.

Further, as shown in FIG. 13, the operator protection apparatus 200 may implement a powered actuator 240 in place of or in conjunction with any of the actuators contemplated herein. In a nonlimiting example, the powered actuator may be a linear actuator and may be electric, pneumatic, or hydraulic. In some aspects, the powered actuator may be coupled to the first over-center linkage 220 at a first actuator-over-center pivot joint 242 and coupled to the first lower portion upright 201 at a first actuator-upright pivot joint 244. In some aspects, the force provided by the powered actuator may apply a force to secure the operator protection apparatus 200 in the locked position.

Figure 14:
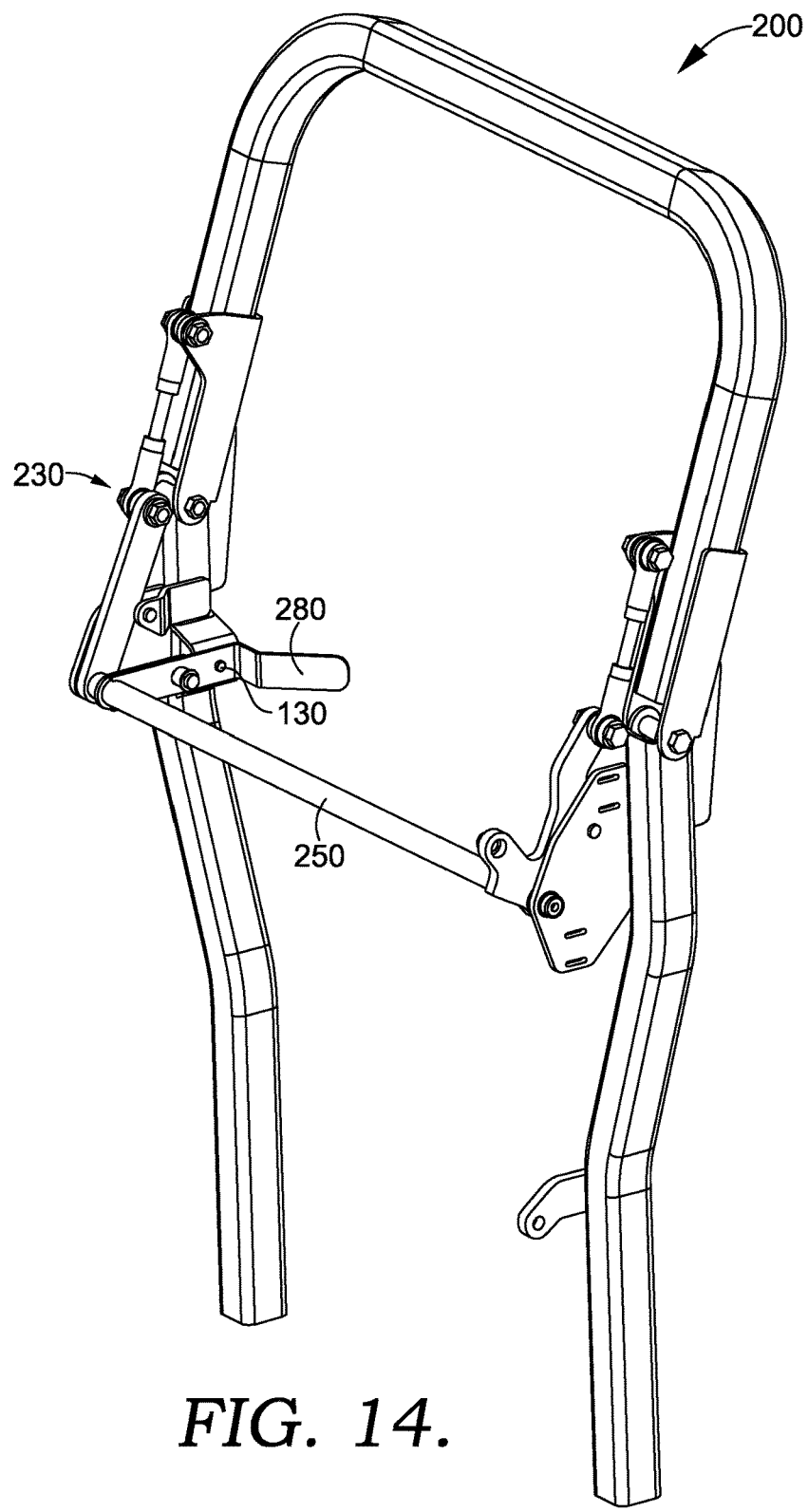
FIG. 14 depicts an alternative perspective view of an operator protection apparatus in a raised position, in accordance with aspects hereof.

Additionally, as shown in FIG. 14, the operator protection apparatus 200 may include a handle 280. The handle 280 may be affixed to the torque tube 250 and positioned such that the handle 280 engages a securing device 130 when the second over-center linkage 230 is in a locked position. Accordingly, the handle 280 may be disengaged from the securing device 130, thereby allowing the over-center linkage to the unlocked and the upper portion to be lowered. As can be appreciated, any of the actuators provided herein may be included on the operator protection apparatus 200 with the handle 280.

Figure 15:
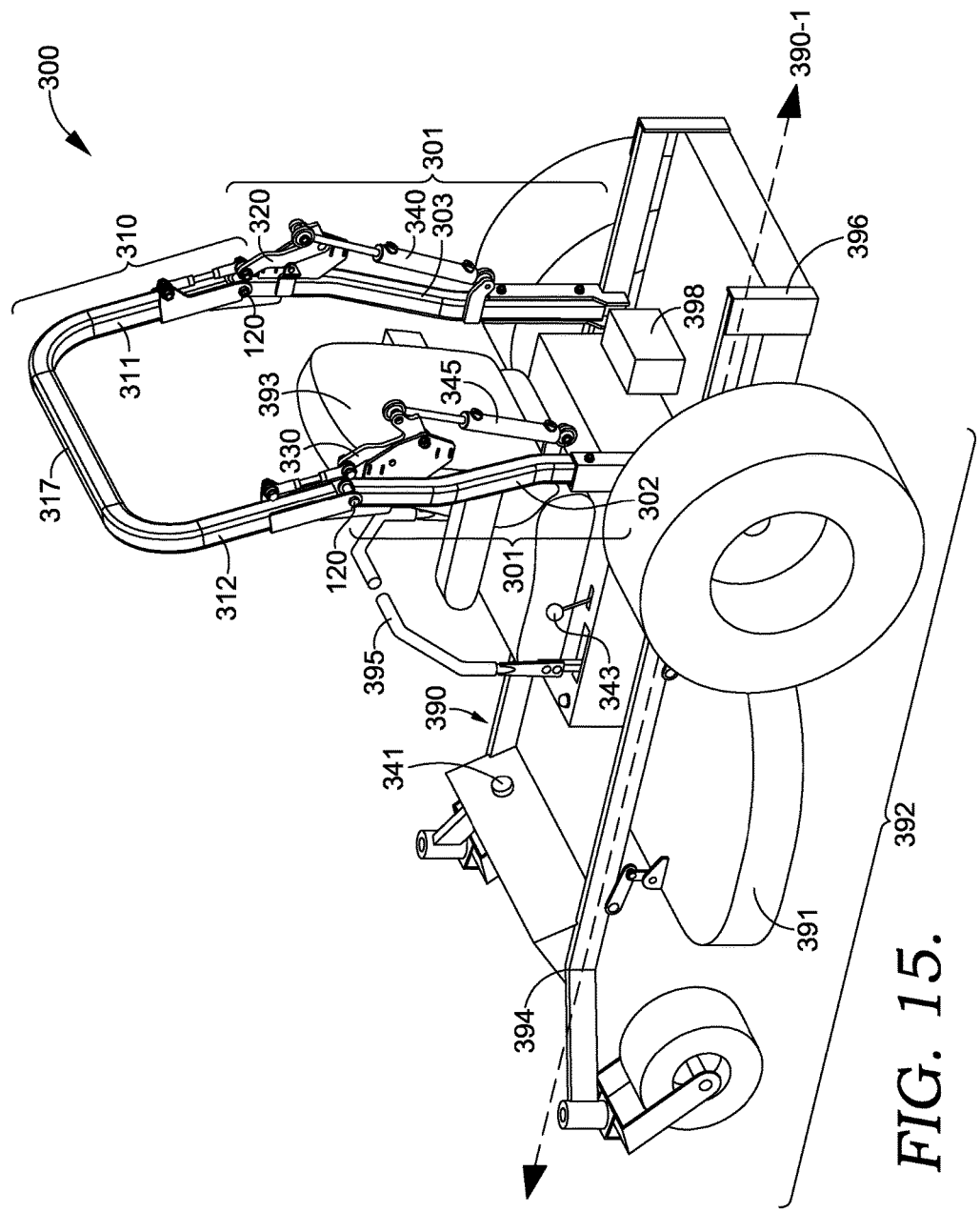
FIG. 15 depicts a riding mower having an operator protection apparatus affixed thereto in a raised position, in accordance with aspects hereof.

With reference now to FIG. 15, in yet another embodiment, an operator protection apparatus 300 having two powered actuators is provided. Accordingly, a first powered actuator 340 and a second powered actuator 345 may be configured to actuate simultaneously and with equal (or different) force. As depicted in FIG. 15, the operator protection apparatus 300 may be affixed to a frame 192 of a vehicle, such as frame 392 of riding mower 390. In some aspects, the riding mower 190 may include a mower deck 391 coupled to the frame 392 and a controller 398. Further, the riding mower 390 may include a seat 393. The frame 392 may include a frame first end 394 and a frame second end 396. In one aspect herein, a horizontal line 390-1 extending from the frame first end 394 to the frame second end 396 defines a horizontal plane, which may be referred to herein in order to describe locations and positions of various components of the operator protection apparatus 300.

The operator protection apparatus 300 may include a lower portion 301 comprising a first lower portion upright 303 and a second lower portion upright 302. Additionally, an upper portion 310 may comprise a transverse member 317 disposed between a first upper portion member 311 and a second upper portion member 312. Further, the operator protection apparatus may have a pair of hinge joints 120 coupling the first lower portion upright 303 to the first upper portion member 311 and the second lower portion upright 302 to the second upper portion member 312, such that the upper portion 310 is movable relative to the lower portion 301.

Additionally, in some aspects, the operator protection apparatus may include a first over-center linkage 320 and a second over-center linkage 330. The first over-center linkage 320 may be coupled to the first lower portion upright 303 and the first upper portion member 311, and the second over-center linkage 330 may be coupled to the second lower portion upright 302 and the second upper portion member 312.

The first powered actuator 340 may be coupled to the first lower portion upright 303 and the first over-center linkage 320. Further, the second powered actuator 345 may be coupled to the second lower portion upright 302 and the second over-center linkage 330. The operator protection apparatus 300 may include at least one input device for controlling the powered actuators 340 and 345. The input device is configured to control actuation of the powered actuators 340 and 345 simultaneously, as mentioned above. In some aspects, the input device may be a simple switch communicatively coupled directly to the powered actuators 340 and 345. In other aspects, the input device may be communicatively coupled to the controller 398, which may control the powered actuators 340 and 345.

In one aspect, the input device may be a foot button 341 that may be depressed by the foot of an operator to initiate actuation for both raising and lowering the upper portion 310. In another aspect, the input device may be a toggle switch 343. For example, holding the toggle switch 343 in a first direction may cause the actuators to lower the upper portion 310 until the switch is released. Additionally, holding the toggle switch 343 in a second direction may cause the actuators 340 and 345 to raise the upper portion 310. Alternatively, momentarily moving the toggle switch 343 in the second direction, rather than holding the toggle switch 343, may cause the actuators 340 and 345 to raise the upper portion to the locked position. Although described in the examples above, the input device may be implemented as any other suitable type of input device and at any other suitable location. For example, the input device may be associated with operator controls 395 such that the operator protection apparatus 300 may be controlled by an operator while the operator is using the operator controls 395.

Figure 16:
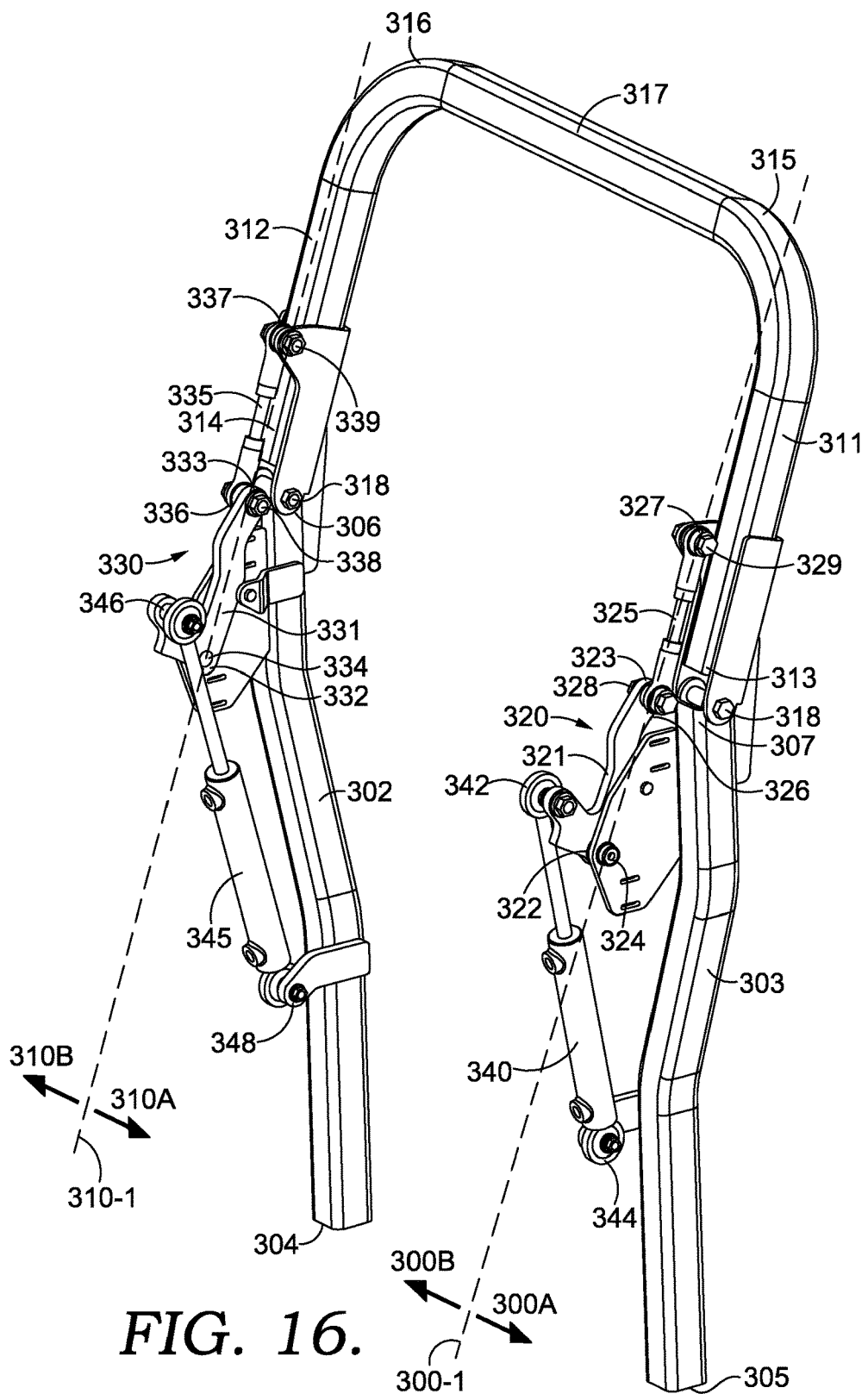
FIG. 16 depicts a perspective view of the operator protection apparatus of FIG. 15 in a raised position, in accordance with aspects hereof.

Turning now to FIG. 16, the first lower portion upright 303 may have a first upright first end 305 and a first upright second end 307. The second lower portion upright 302 may have a second upright first end 304 and a second upright second end 306. In one aspect, the first upright first end 305 and the second upright first end 304 may be affixed to a frame of a terrain working vehicle (for example riding mower 390). The first upper portion member 311 may have a first member first end 313 and a first member second end 315. The second upper portion member 312 may have a second member first end 314 and a second member second end 316.

The first over-center linkage 320 may comprise a first lower link assembly 321 having a first lower link first end 322 and a first lower link second end 323. The first lower link first end 322 may be pivotably coupled to the first lower portion upright 303 at a first lower link pivot joint 324. The first over-center linkage 320 may also comprise a first upper link assembly 325 having a first upper link first end 326 and a first upper link second end 327. The first upper link assembly 325 first end may be pivotably coupled to the first lower link second end 323 at a first center pivot joint 328. Further, the first upper link second end 327 may be pivotably coupled with the first upper portion member 311 at a first upper pivot joint 329. In one aspect, the first powered actuator 340 is coupled to the first over-center linkage 320 at a first actuator-over-center pivot joint 342 and coupled to the first lower portion upright 303 at a first actuator-upright pivot joint 344.

The operator protection apparatus 300 may comprise a second over-center linkage 330. The second over-center linkage 330 may comprise a second lower link assembly 331 having a second lower link first end 332 and a second lower link second end 333. The second lower link first end 332 may be pivotably coupled to the second lower portion upright 302 at a second lower link pivot joint 334. The second over-center linkage 330 may also comprise a second upper link assembly 335 having a second upper link first end 336 and a second upper link second end 337. The second upper link assembly 335 first end may be pivotably coupled to the second lower link second end 333 at a second center pivot joint 338. Further, the second upper link second end 337 may be pivotably coupled with the second upper portion member 312 at a second upper pivot joint 339. The second powered actuator 345 may be coupled to the second over-center linkage 330 at a second actuator-over-center pivot joint 346 and coupled to the second lower portion upright 302 at a second actuator-upright pivot joint 348.

The first over-center linkage 320 may be in a locked position when the first center pivot joint 328 is on a first centerline first side 300A of a first centerline 300-1 extending between the first lower link pivot joint 324 and the first upper pivot joint 329. The second over-center linkage 330 may be in a locked position when the second center pivot joint 338 is on a second centerline first side 310A of a second centerline 310-1 extending between the second lower link pivot joint 334 and the second upper pivot joint 339.

Figure 17:
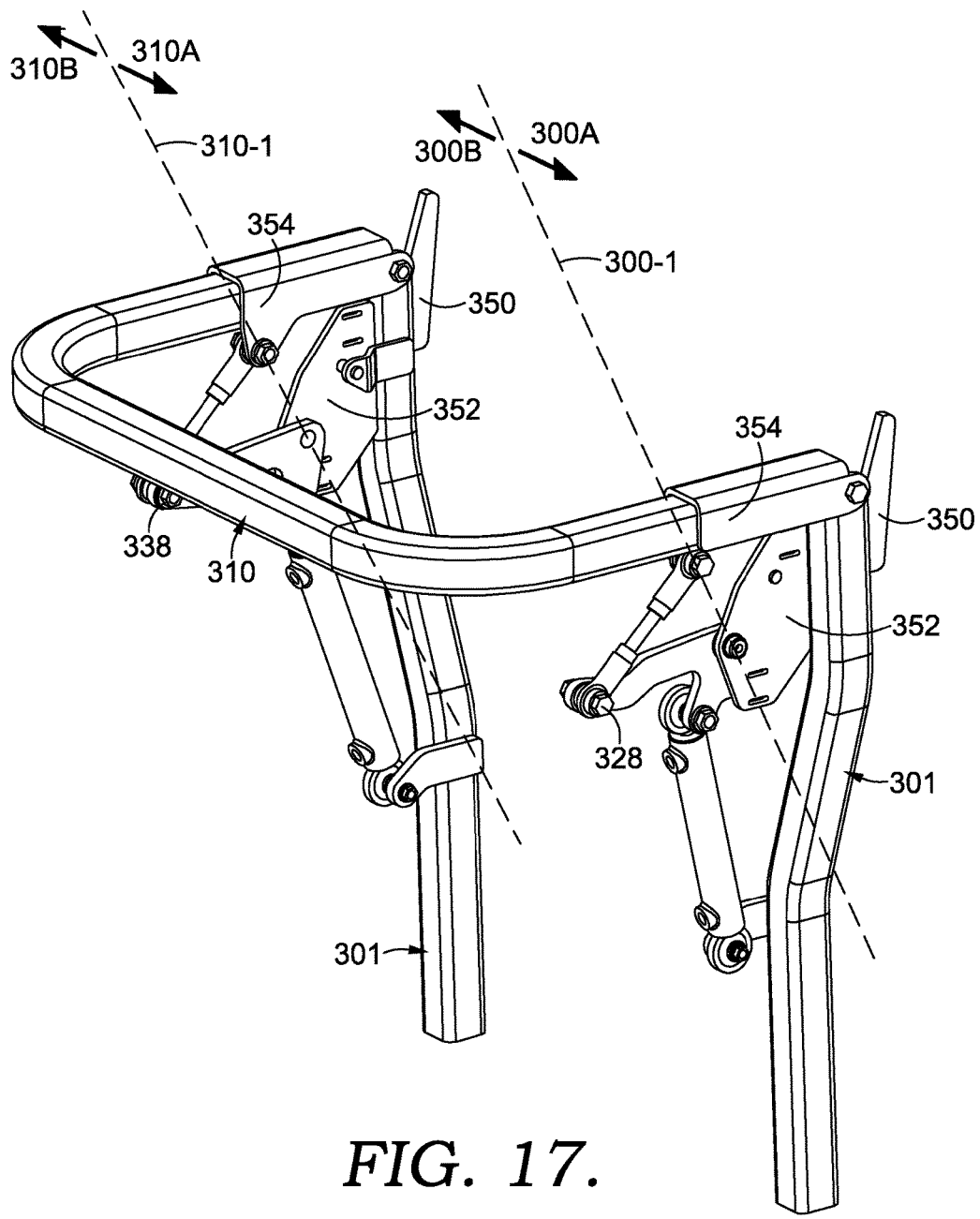
FIG. 17 depicts a perspective view of the operator protection apparatus of FIG. 15 in a lowered position, in accordance with aspects hereof.

Turning now to FIG. 17, the first over-center linkage 320 may be in an unlocked position when the first center pivot joint 328 is on a first centerline second side 300B of the first centerline 300-1. Accordingly, the second over-center linkage 330 is in an unlocked position when the second center pivot joint 338 is on a second centerline second side 310B of the second centerline 310-1. Additionally, similar to the embodiments described hereinabove, the operator protection apparatus 300 may include one or more stops 350 that limit a range of motion of the upper portion 310 relative to the lower portion 301. Further, the operator protection apparatus 300 may include a pair of lower portion brackets 352 and a pair of upper portion brackets 354 for coupling the first over-center linkage 320 and the second over-center linkage 330 to the lower portion 301 and the upper portion 310.

Figure 18:
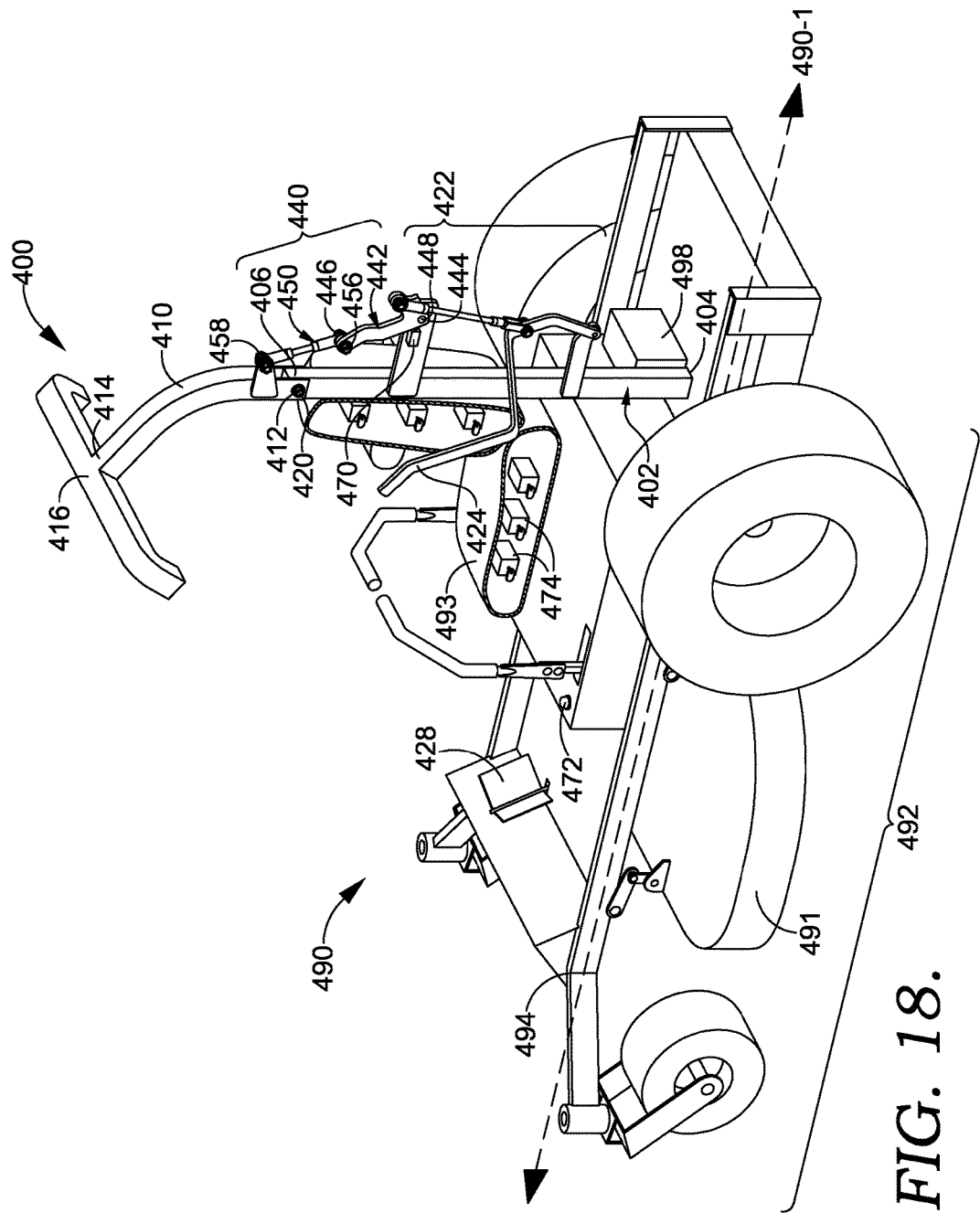
FIG. 18 depicts a riding mower having an alternative operator protection apparatus affixed thereto in a raised position, in accordance with aspects hereof.

In an additional embodiment, as depicted in FIG. 18, an operator protection apparatus 400 may be affixed to a frame of a vehicle, such as frame 492 of riding mower 490. In some aspects, the riding mower may include a mower deck 491 coupled to the frame 492 and a controller 498. Further, the riding mower 490 may include a seat 493. The riding mower may comprise, a frame 492 having a frame first end 494 and a frame second end 496. In one aspect herein, a horizontal line 490-1 extending from the frame first end 494 to the frame second end 496 defines a horizontal plane, which may be referred to herein in order to describe locations and positions of various components of the operator protection apparatus 400.

The operator protection apparatus 400 may include a lower portion 402 comprising a lower portion first end 404 and a lower portion second end 406. Additionally, the operator protection apparatus 400 may include an upper portion 410 comprising a single upper portion member having an upper portion first end 412 and an upper portion second end 414. The upper portion 410 may include a cross member 416 affixed to the upper portion second end 414.

Further, the operator protection apparatus 400 may have a hinge joint 420 coupling the lower portion second end 406 to the upper portion first end 412, such that the upper portion 410 is movable relative to the lower portion 402.

Additionally, in some aspects, the operator protection apparatus may include an over-center linkage 440 coupled the lower portion 402 and the upper portion 410. In some aspects, the over-center linkage 440 may include a lower link assembly 442 having a lower link first end 444 and a lower link second end 446 pivotably coupled to the lower portion 402 at a lower pivot joint 448. Further, the over-center linkage 440 may include an upper link assembly 450 pivotably coupled to the lower link assembly 442 at a center pivot joint 456. The lower link first end may be pivotably coupled to the lower portion 402 at the lower pivot joint 448. Additionally, the upper link assembly 450 may be pivotably coupled with the upper portion 410 at an upper pivot joint 458. The lower link assembly first end may be pivotably coupled to the lower portion 402 at the lower pivot joint 448. Further, the over-center linkage 440 may include an upper link assembly 450 having an upper link first end 452 and an upper link second end 454. The upper link first end 452 may be pivotably coupled to the lower link second end 446 to at the center pivot joint 456. Additionally, the upper link assembly second end may be pivotably coupled with the upper portion 410 at an upper pivot joint 458.

Additionally, the operator protection apparatus 400 may include an actuator 422 coupled to the lower portion 402 and the over-center linkage 440. In one aspect, the actuator may comprise a hand lever 424, although any of the actuators contemplated herein may be used. For example, similar to the riding mower depicted in FIG. 1, the riding mower 490 may include a foot pedal 428. The foot pedal 428 may have a first side and a second side that rotate about a pivot such that both sides of the pedal may be pushed by an operator and may be associated with a mechanical actuator, as described hereinabove.

The operator protection apparatus 400 may also include a position sensor 470. Further, the operator protection apparatus 400 may be coupled to one or more indicators. The one or more indicators may provide a warning or a notification that a position of the operator protection apparatus 400 should be changed, or is in an unlocked position. For example, a visual indicator 472, which may be a light, may provide a visual indication that the operator protection apparatus 400 should be in the locked position. Additionally, one or more tactile indicators 474 may be employed to notify or warn the operator of a condition related to the operator protection apparatus 400. Further, the one or more indicators may include an audio indicator (although not shown here, the audio indicator may be associated with the controller 498).

Turning now to a general discussion of each of the embodiments described hereinabove, a variety of additional features may be implemented with each of the embodiments. Additionally, some of the features described hereinabove may include variations, which may be applicable to each of the embodiments described herein. For example, although the over-center linkages described hereinabove and depicted in the figures may provide an advantageous configuration, other configurations should be considered within the scope of this disclosure. For example, it is contemplated that an over-center linkage could be positioned such that it is affixed to either an interior surface or an exterior surface of an operator protection apparatus.

Additionally, the hinge joints described hereinabove may alternatively be described as including the over-center linkages. Said another way, a hinge joint that includes an over-center linkage for locking an operator protection system has been contemplated and should be considered within the scope of this disclosure. Additionally, it should be appreciated that the features of the various embodiments described herein may be incorporated with one another.

In another aspect, an operator protection apparatus may be provided without an actuator. In one aspect, a grip or other member may extend from the a center pivot joint of at least one over-center linkage. Accordingly, the over-center linkage may be unlocked without employing an actuator. In another aspect, a rod may extend between center pivot joints of two over-center linkages. The rod may be manually moved between the locked and unlocked position.

Further, the one or more sensors described hereinabove may include any number of sensors associated with a vehicle and/or the operator protection apparatus. In some aspects, the operator protection apparatus may include logic that is integrated with the apparatus or is configured for integration with a controller, or other computing device associated with the vehicle. Accordingly, an operator protection apparatus may receive sensor data from a variety of sensors. For example, a vehicle may include a tilt sensor configured to detect a tilt of the vehicle, for example in a controller (e.g. controller 198, 298, 398, or 498). In another aspect, the tilt sensor may be provided and included with the operator protection apparatus. Additionally, the operator protection apparatus may be configured to receive sensor data from a seatbelt sensor associated with the vehicle including, for example, whether the seatbelt is buckled or unbuckled.

The sensed data obtained from different sensors may be used by the operator protection apparatus logic to make a number of determinations. For example, the sensor data may be used to determine that the operator protection apparatus is in a lowered position, and the seatbelt is engaged. In this scenario, the operator protection apparatus may cause the controller to disengage the mower blades. In another aspect, the sensed data may be used to determine that the operator protection apparatus is in a raised position and the seatbelt is disengaged. In this example, similar to the previous scenario, the operator protection apparatus may communicate a command to the controller to disengage the blades. In additional aspects, the operator protection apparatus may activate one or more indicators (e.g., a visual indicator 472 and a tactile indicators 474) or warning signals, based on the sensor data. For example, the sensor data may be used to activate audio, visual, or tactile indicators for alerting an operator of the vehicle that a state of the vehicle or the operator protection apparatus should be changed.

Lever-Actuated Operator Protection Apparatus

In accordance with other aspects of this invention, a lever-actuated operator protection apparatus is described herein. The lever-actuated operator protection apparatus may be affixed to a terrain working vehicle, for example a riding mower, and may include a manually-operable lever that is positioned to be accessible from the seat of the riding mower. As a result, the lever-actuated operator protection apparatus may be moved between raised and lowered positions by an operator in a seated position on the riding mower.

As discussed above, traditional operator protection apparatuses often required that an operator leave the seat of the vehicle in order to manually raise and lower the top portion of the operator protection apparatuses. In contrast to traditional operator protection apparatuses, the lever-actuated operator protection apparatuses described herein provide a manually-powered mechanism for raising and lowering operator protection apparatuses without leaving the seat of the vehicle.

Figure 19:
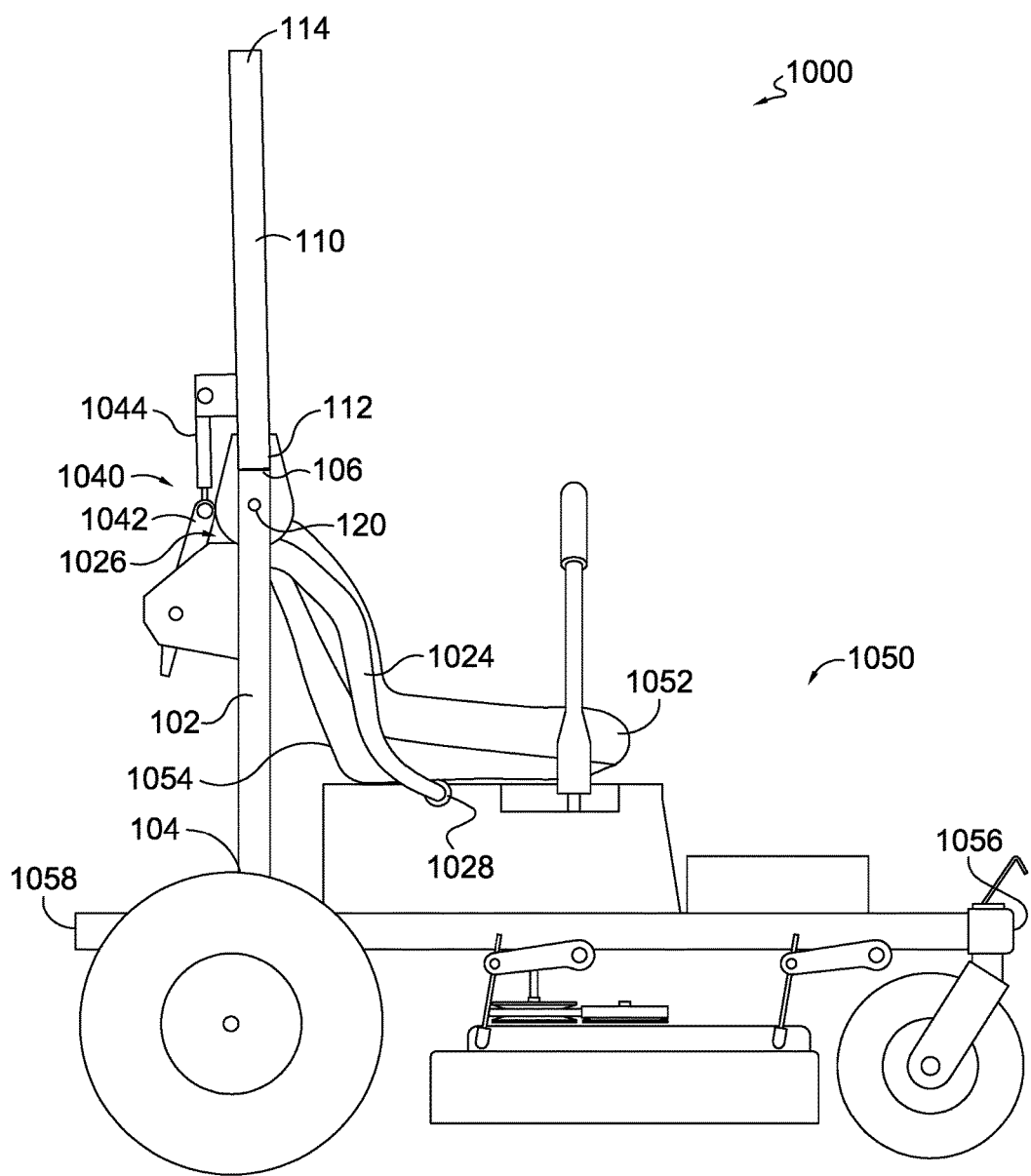
FIG. 19 depicts a side view of a terrain working vehicle with a lever-actuated operator protection apparatus, in accordance with aspects hereof.

Turning now to FIG. 19, an exemplary lever-actuated operator protection apparatus 1000 with a lever 1024 is depicted on an exemplary terrain working vehicle 1050 (in this case, a riding mower). The lever-actuated operator protection apparatus 1000 includes a lower portion 102 with a lower portion first end 104, which may be affixed to a frame of a terrain working vehicle 1050, and a lower portion second end 106. The lever-actuated operator protection apparatus 1000 also includes an upper portion 110 having an upper portion first end 112 and an upper portion second end 114. Additionally, the lever-actuated operator protection apparatus 1000 includes at least one hinge joint 120 rotatably coupling the lower portion second end 106 and the upper portion first end 112. Accordingly, the upper portion 110 is movable relative to the lower portion 102 between a raised position (depicted, e.g., in FIGS. 19 and 20) and a lowered position (depicted, e.g., in FIGS. 21 and 22), for example, by rotating the upper portion 110 about the hinge joint 120. The structure of the lower portion 102, the upper portion 110, and the hinge joint 120 are described in detail hereinabove, for example, with reference to FIG. 3, and as such, will not be repeated in full here.

Aspects hereof may be described using directional terminology. For example, the terms "horizontal" and "horizontally" as used herein refer to direction and describe an orientation generally parallel to the surface of the earth or a longitudinal direction. Accordingly, the terms "vertical" and "vertically" as used herein refer to a direction perpendicular to, or more perpendicular than parallel to, horizontal. Additionally, relative location terminology will be utilized herein. For example, the term "proximate" is intended to mean on, about, near, by, next to, at, and the like. Therefore, when a feature is proximate another feature, it is close in proximity, but not necessarily exactly at the described location, in some aspects.

Further, terminology relating to relative positions of various features of the embodiments described is also used herein. Accordingly, the terms "forward," and "forward of" should be interpreted according to the figures. For example, with respect to FIGS. 19-26, if hypothetical feature A is "forward of" hypothetical feature B, then hypothetical feature A is nearer a front end 1056 of the terrain working vehicle 1050 (as depicted in FIGS. 19 and 22) than hypothetical feature B. Conversely, if hypothetical feature A is "rearward of" hypothetical feature B, then hypothetical feature A is nearer a rear end 1058 of the terrain working vehicle 1050 (as depicted in FIGS. 19 and 22) than hypothetical feature B. Further, the term "above" refers to a feature that is nearer the upper portion second end 114 (as depicted in FIG. 19), as compared to another feature. Similarly, the term "below" refers to a feature that is nearer the lower portion first end 104 (as depicted in FIG. 19), as compared to another feature. Accordingly, even where a terrain working vehicle is not depicted in the figures, relative positions of features should be interpreted as described above, unless specifically indicated otherwise.

Returning once again to FIG. 19, the lever 1024 is generally operable to provide a force to move the upper portion 110 between the raised position and the lowered position. The lever 1024, which may be a hand lever, includes a lever first end 1026 and a lever second end 1028. The lever first end 1026 may be coupled with the lever-actuated operator protection apparatus 1000 at any suitable location, as will be described in more detail below. The lever second end 1028 is generally positioned such that the lever second end 1028 is accessible from a seat 1052 of the terrain working vehicle 1050 when the upper portion is in each of the raised and lowered positions.

For example, the lever second end 1028 may be positioned forward of the hinge joint 120, forward of a rearmost portion of a seatback 1054 of the seat 1052, or proximate a bottom portion of the seat 1052, when the upper portion 110 is in a raised position. Accordingly, the lever 1024 is effective to move the upper portion 110 between the raised position and the lowered position, for example, when force is applied to the lever second end 1028.

In some aspects, the lever-actuated operator protection apparatus 1000 includes a lever linkage 1040 having a lever linkage first link 1042 coupled with the lower portion 102 and a lever linkage second link 1044 coupled with the upper portion 110. The a lever linkage first link 1042 and the lever linkage second link 1044 may be pivotably coupled at a lever linkage pivot joint 1048. In some aspects, the lever linkage 1040 may be an over-center linkage, or other type of mechanical linkage. Further, in some aspects, the lever first end 1026 may be coupled with the lever-actuated operator protection apparatus 1000 at, or via, the lever linkage 1040. However, it should be appreciated that the lever-actuated operator protection apparatus 1000 is not limited to embodiments having the lever linkage 1040, an over-center linkage, or any other type of linkage.

Figure 20:
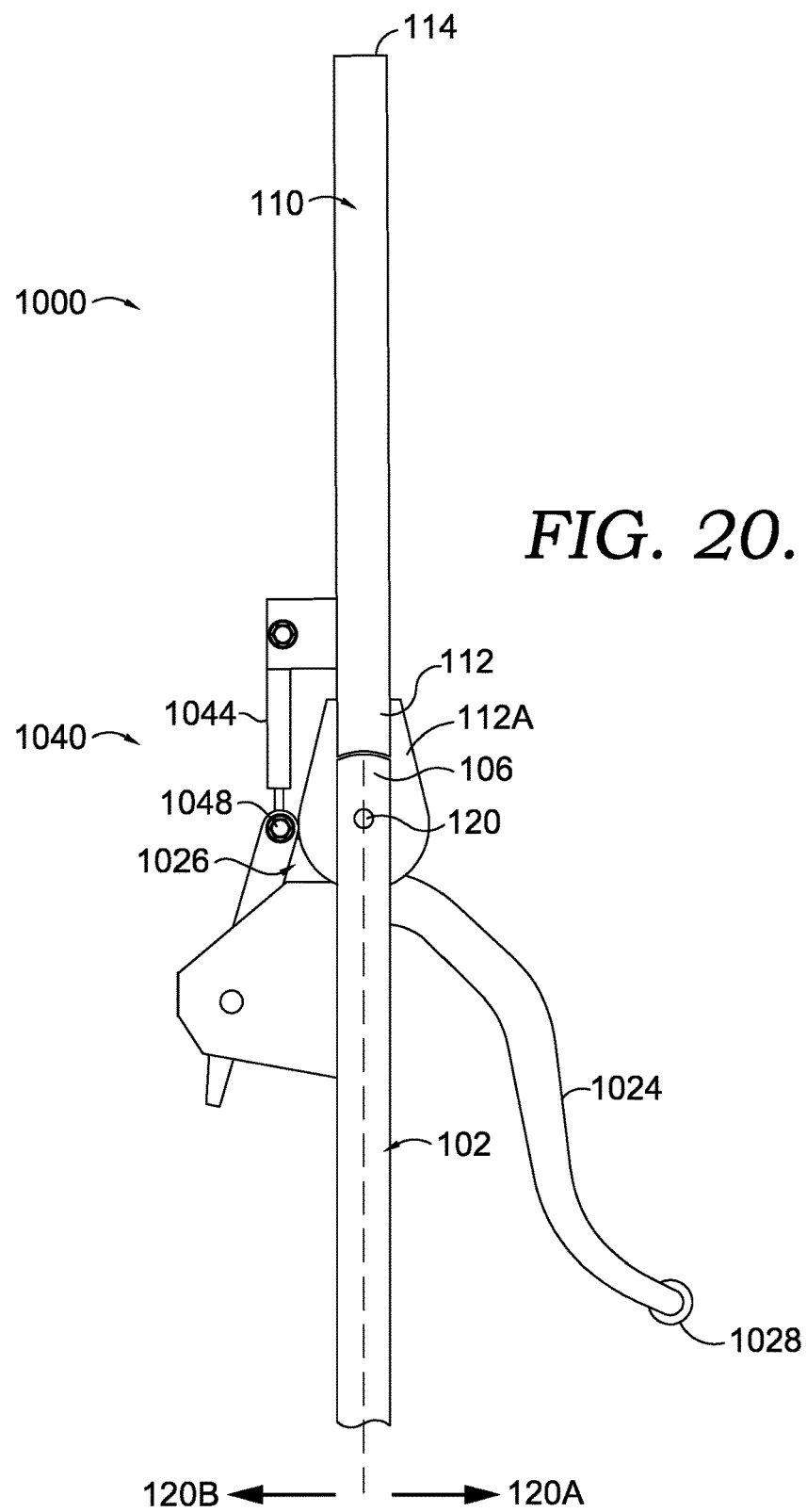
FIG. 20 depicts a side view of the lever-actuated operator protection apparatus of FIG. 19, in a raised position, in accordance with aspects hereof.

Turning now to FIG. 20, the lever-actuated operator protection apparatus 1000 is depicted with the upper portion 110 in the raised position. As mentioned above, the lever second end 1028 may be positioned forward of the hinge joint 120, in the direction indicated by arrow 120A, when the upper portion 110 is in the raised position. Arrow 120A generally indicates a direction oriented toward the front end of the terrain working vehicle (indicated as reference numeral 1056 in FIG. 19). Accordingly, the lever second end 1028 is positioned proximate a seat of a terrain working vehicle to which the lever-actuated operator protection apparatus 1000 is attached, when the upper portion 110 is in the raised position.

In some aspects, the upper portion first end 112 may include an upper portion first end bracket 112A. The upper portion first end bracket 112A may be mated with the lower portion second end 106 such that the upper portion 110 is rotatable about the hinge joint 120 relative to the lower portion 102.

Figure 21:
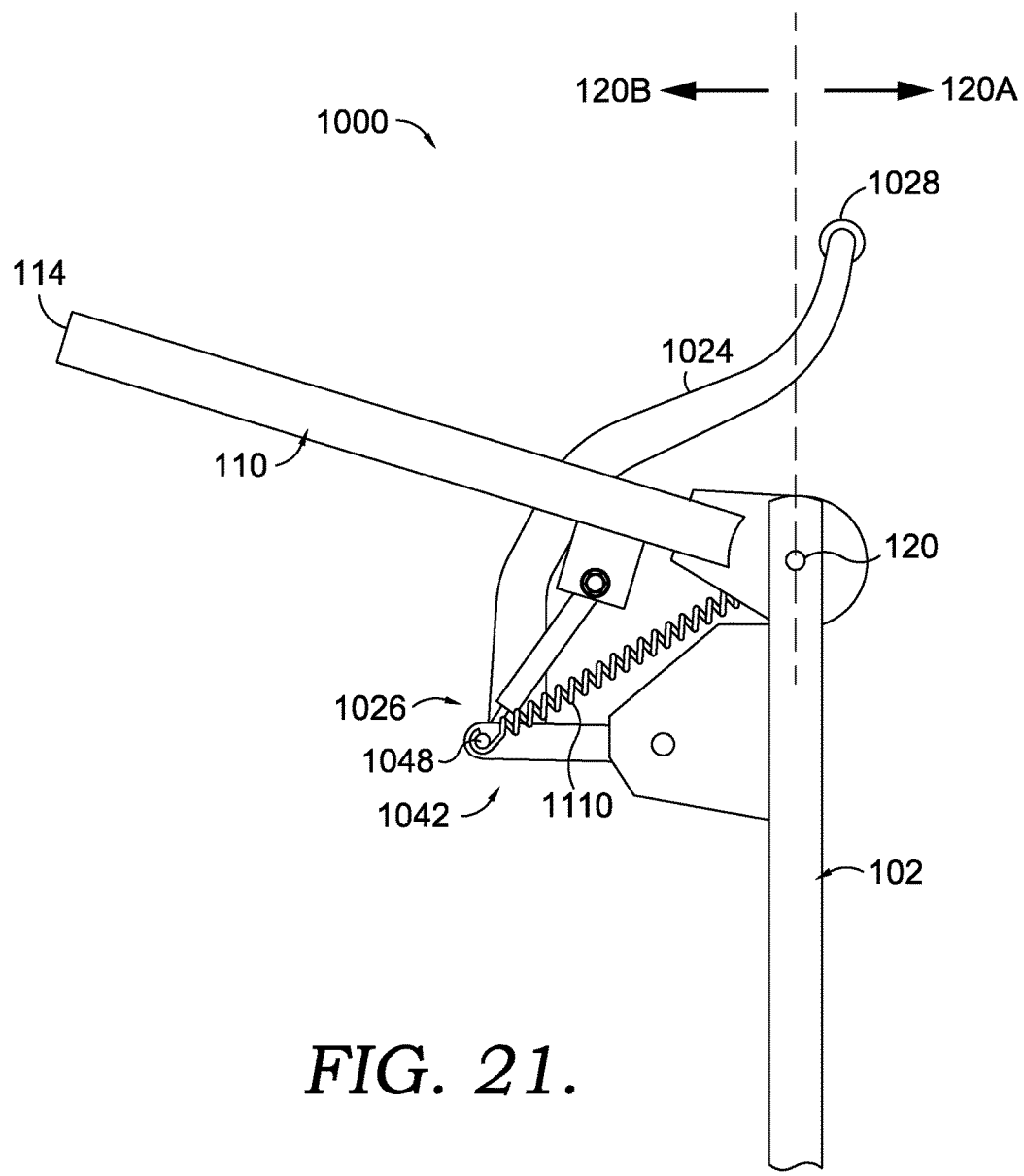
FIG. 21 depicts a side view of the lever-actuated operator protection apparatus of FIGS. 19 and 20, in a lowered position, in accordance with aspects hereof.
Figure 22:
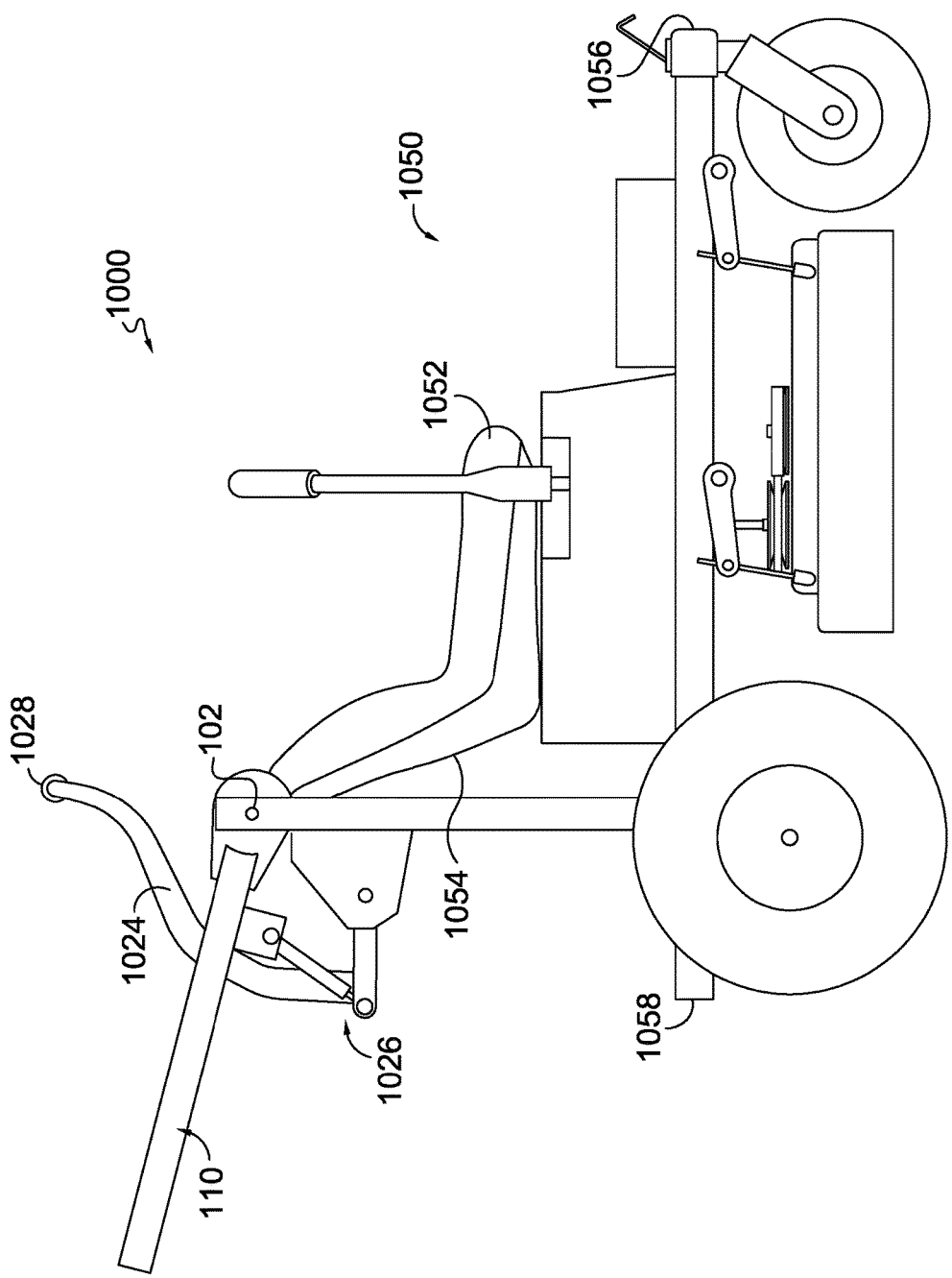
FIG. 22 depicts a side view of the terrain working vehicle with the lever-actuated operator protection apparatus of FIG. 19, in the lowered position, in accordance with aspects hereof.

FIG. 21 depicts the lever-actuated operator protection apparatus 1000 of FIG. 20, with the upper portion 110 in the lowered position. In operation, when a force is received via the lever 1024 (e.g., at the lever second end 1028), the lever 1024 is effective to rotate the upper portion 110 about the hinge joint 120. For example, as depicted here, the upper portion second end 114 has been moved in a counterclockwise direction as compared to the position shown in FIG. 20. In some aspects, the lever-actuated operator protection apparatus 1000 may include a return spring 1110 that counteracts, at least in part, a weight of the upper portion 110 and biases the upper portion 110 toward the raised position. The return spring 1110 may be coupled with the hinge joint 120 (or lower portion 102) and the lever linkage pivot joint 1048 (or other location on the lever linkage 1040). In this exemplary aspect, the return spring 1110 provides a force in a direction of a force required to return the upper portion 110 to the raised position. The return spring 1110 depicted here provides one exemplary type of mechanism that may be used, but, it should be appreciated that any number of suitable mechanisms or structures may be employed to assist with returning the upper portion 110 to the raised position. For example, additional return/lift-assist mechanisms are discussed hereinabove with reference to FIG. 12, and below with reference to FIG. 26. However, the return/lift-assist mechanisms depicted in the figures are not intended to be limiting. Rather, any type of suitable mechanism that provides a force that facilitates rotation of the upper portion 110 from the lowered position toward the raised position is considered within the scope of this disclosure.

In some aspects, the lever second end 1028 may remain forward of the hinge joint 120 when the upper portion 110 is in the lowered position, as indicated by arrow 120A. In other aspects, the lever second end 1028 may be positioned rearward of the hinge joint 120 when the upper portion 110 is in the lowered position, in the direction indicated by arrow 120B.

However, it should be appreciated that the lever-actuated operator protection apparatus 1000 is configured such that the lever second end 1028 remains accessible from an operator position, such as a seat, of a terrain working vehicle when the upper portion 110 is in the lowered position. For example, as shown in FIG. 22, the lever second end 1028 may be positioned forward of, or approximately aligned with, a rearmost portion of the seatback 1054 of the terrain working vehicle 1050, when the upper portion 110 is in the lowered position. As such, the lever second end 1028 remains accessible from the seat 1052 when the upper portion 110 is in the lowered position so that the upper portion 110 may be returned to the raised position from the seat 1052.

Figure 23:
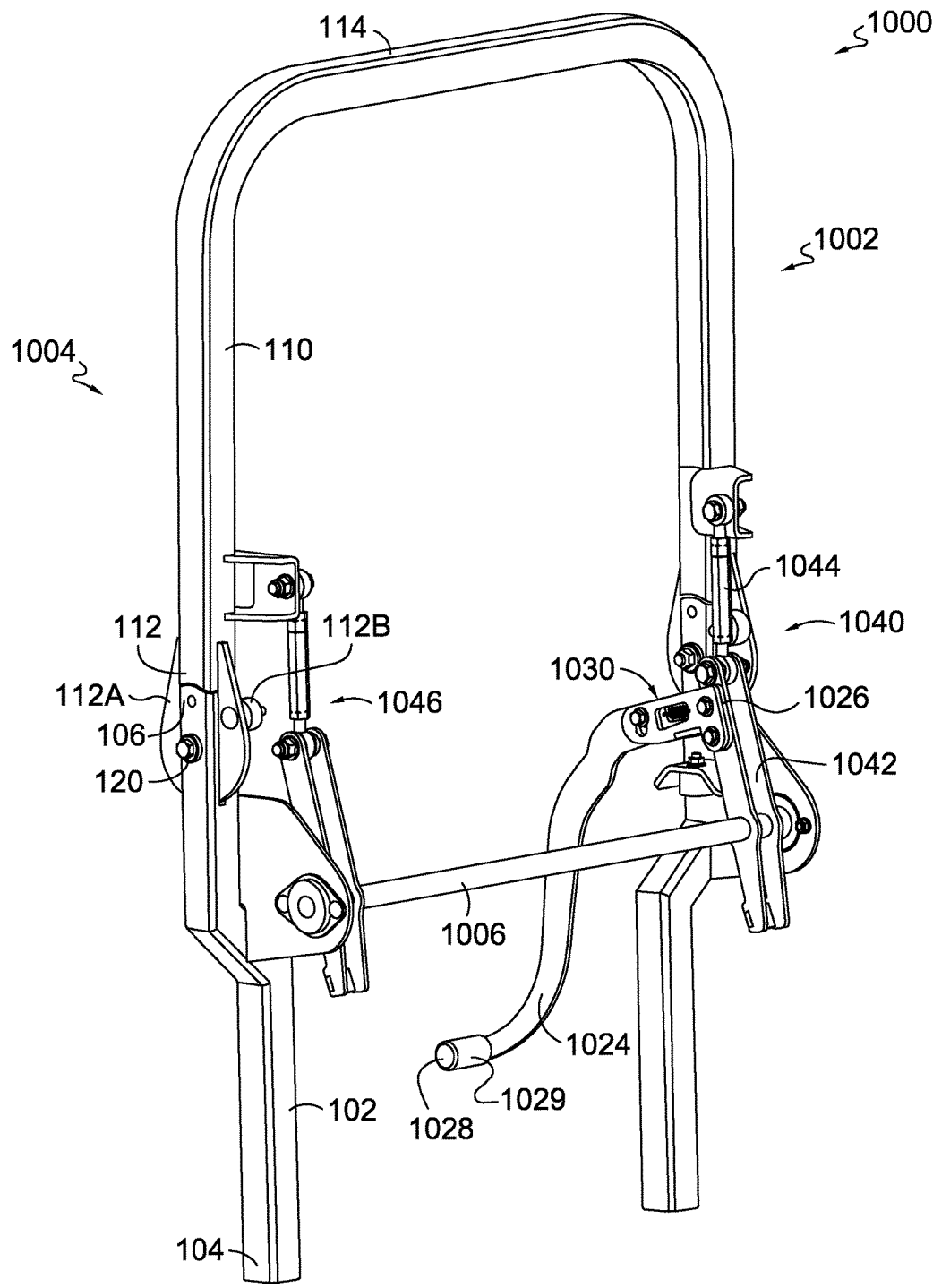
FIG. 23 depicts a perspective view of the lever-actuated operator protection apparatus of FIGS. 19-22, in the raised position, in accordance with aspects hereof.

FIG. 23 depicts a perspective view of the lever-actuated operator protection apparatus 1000 shown in FIGS. 19-22, in the raised position. The lever-actuated operator protection apparatus 1000 may include an operator protection apparatus first side 1002 and an operator protection apparatus second side 1004. The operator protection apparatus second side 1004 is generally laterally spaced apart from the operator protection apparatus first side 1002.

Additionally, FIG. 23 depicts a first lever linkage 1040 coupled with the upper portion 110 and the lower portion 102 at the operator protection apparatus first side 1002, and a second lever linkage 1046 coupled with the upper portion 110 and the lower portion 102 at the operator protection apparatus second side 1004. As mentioned above, the lever first end 1026 may be coupled with the first lever linkage 1040, for example, at the lever linkage first link 1042. Additionally, the lever 1024 may include a grip 1029 proximate the lever second end 1028. In some aspects, the lever linkage 1040 may provide a mechanical advantage for moving the upper portion 110 between the raised and lowered positions, and for retaining the upper portion 110 in the raised position. Accordingly, in some aspects, the lever 1024 acts on the lever linkage 1040 to move the upper portion 110 between a raised and lowered positions.

However, it should be appreciated that the lever 1024 may be coupled with the lever-actuated operator protection apparatus 1000 at any suitable position, for example, directly with the upper portion 110, or with a torque tube, such as torque member 1006. As shown here, the torque member 1006 may be coupled with the first lever linkage 1040 and coupled with the second lever linkage 1046. In other aspects, the torque member 1006 may be directly coupled with the operator protection apparatus first side 1002 and the operator protection apparatus second side 1004.

In some embodiments, the lever-actuated operator protection apparatus 1000 may include a latching mechanism 1030. The latching mechanism 1030 may be coupled with the lever 1024, for example, proximate the lever first end 1026. The latching mechanism 1030 will be discussed in more detail below with respect to FIGS. 24 and 25, but in general, the latching mechanism 1030 is biased toward an engaged position to provide securement of lever 1024 to retain the upper portion 110 in the raised position.

Although some exemplary aspects of rotatably coupling the upper portion 110 and the lower portion 102 are depicted in the figures, any suitable mechanism for doing so is considered within the scope of this disclosure. In the exemplary aspect depicted in FIG. 23, the upper portion first end bracket 112A may comprise a relatively flat structure that is fitted within a channel or cutout formed within the lower portion second end 106, and held in place by the hinge joint 120. In some aspects, the upper portion first end bracket 112A may include a motion-limiting stop 112B, which limits a range of motion of the upper portion 110. The motion-limiting stop 112B may be adjustable throughout a range of positions to accommodate different types of terrain working vehicles. In some aspects, the motion limiting stop may include a suitable material for dampening contact forces, such as a polymer based material.

Figure 24:
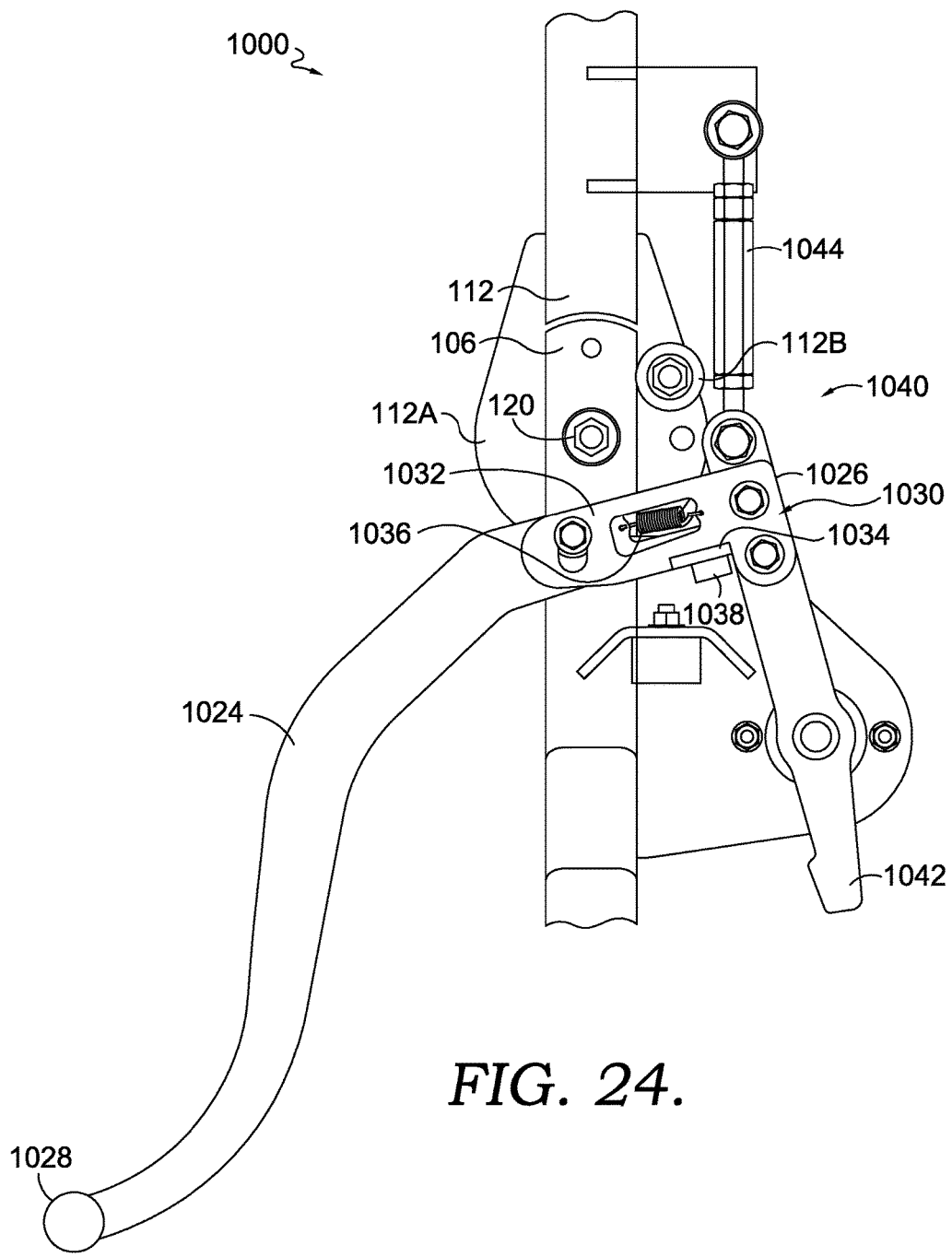
FIG. 24 depicts a close-up side view of the lever-actuated operator protection apparatus depicted in FIG. 23, the lever-actuated operator protection apparatus having a latching mechanism, in an engaged position, in accordance with aspects hereof.

Turning now to FIG. 24, a close-up side view of the lever-actuated operator protection apparatus 1000 of FIG. 23 is depicted. The latching mechanism 1030 is shown in more detail here, in an engaged position, and may include a latch 1032 and a catch 1034. In some aspects, the latch 1032 may be coupled with and adjacent to the lever first end 1026, and the catch 1034 may be coupled with the lower portion 102. As can be appreciated, the lower portion 102 is substantially static relative to the vehicle/equipment to which it is attached. Accordingly, the catch 1034 may provide an anchor point for limiting movement of the lever 1024 (and the upper portion 110) relative to the lower portion 102. In some aspects, the latching mechanism 1030 comprises a biasing mechanism 1036 that biases the latch 1032 toward an engaged position, in which the latch 1032 maintains contact with the catch 1034. For example, the latch 1032 may include a lip 1033 that engages the catch 1034. The lip 1033 may overhang or overlap the catch 1034 in the engaged position, such that the lip 1033 is contiguous to (or substantially contiguous to) the catch 1034. The exemplary biasing mechanism 1036 depicted here provides tension between the latch 1032 and the lever 1024, thereby inhibiting movement of the latch 1032 from the engaged position to a disengaged position. Although the biasing mechanism 1036 is depicted in the figures as a spring, any suitable mechanism or material is considered within the scope of this disclosure.

The latching mechanism 1030 may also include a latch sensor 1038 operably coupled with the latching mechanism 1030 to detect a position (e.g., engaged or disengaged) of the latching mechanism 1030 and/or the lever-actuated operator protection apparatus 1000. In some aspects, the latch sensor 1038 may be a switch, which is depressed when the latch 1032 is engaged. The latch sensor 1038 may be communicatively coupled with a controller (or other computing device) of a terrain working vehicle or associated with the lever-actuated operator protection apparatus 1000. The latch sensor 1038 (and/or the controller/computing device) may also be communicatively coupled with one or more indicators, such as indicator lights, audible indicators, tactile indicators, and the like. A detailed discussion of sensors and indicators, which is applicable to latch sensor 1038, is included hereinabove with reference to FIG. 18, and, as such, will not be repeated in full here.

Figure 25:
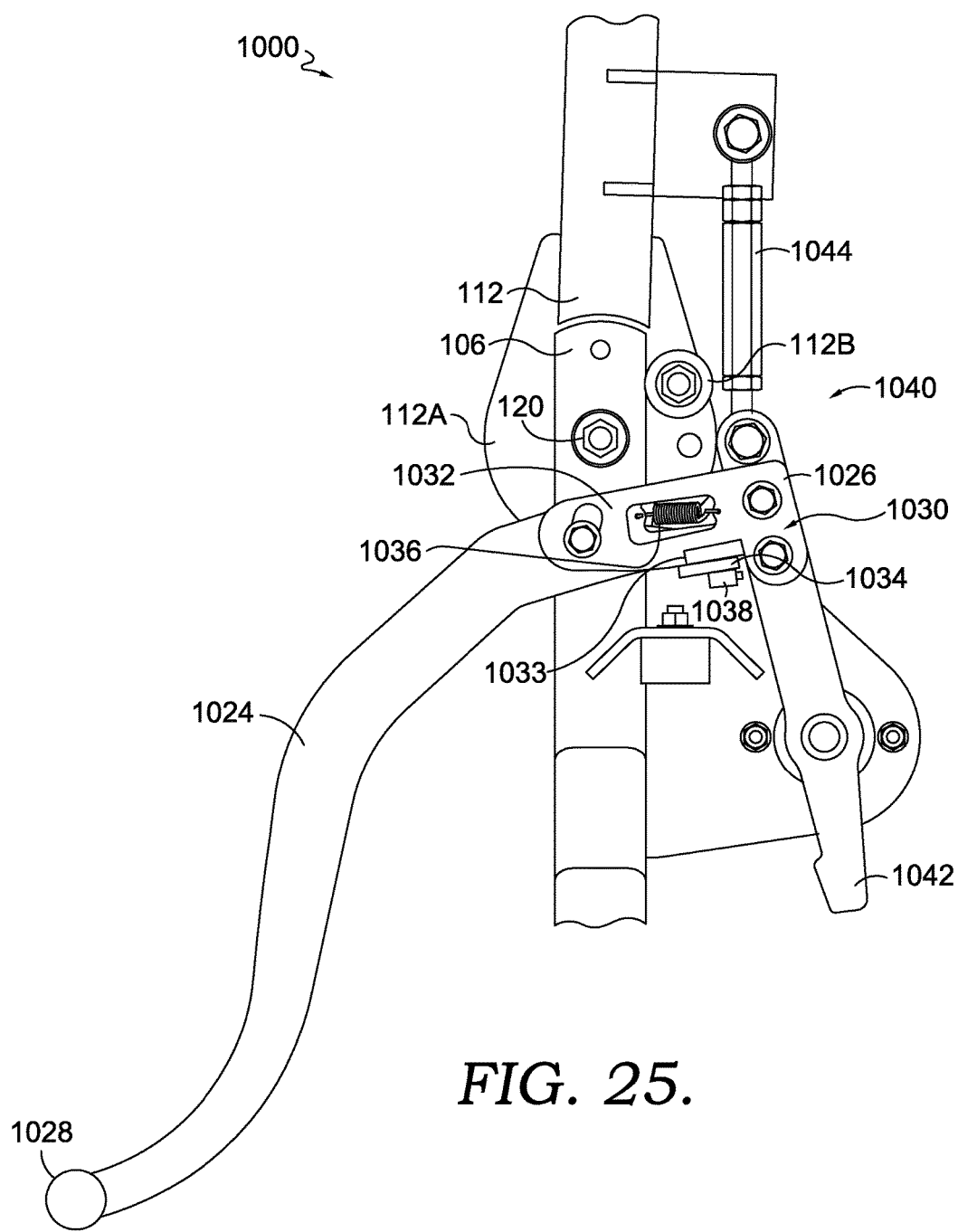
FIG. 25 depicts a close-up side view of the lever-actuated operator protection apparatus of FIG. 24, having the latching mechanism, in a disengaged position, in accordance with aspects hereof.

Turning now to FIG. 25, the latching mechanism 1030 is depicted in the disengaged position. When the lever 1024 is moved with sufficient force to overcome the tension between the latch 1032 and the lever 1024 provided by the biasing mechanism 1036, the lip 1033 is raised above the catch 1034. Accordingly, in operation, the lever 1024 is effective to move the latch 1032 from the engaged position to the disengaged position as the lever 1024 moves the upper portion 110 from the raised position toward the lowered position. For example, as compared to FIG. 24, the lever 1024 has been rotated in a clockwise direction, moving the lip 1033 vertically above the catch 1034, thereby allowing the upper portion 110 to rotate rearward toward the lowered position. It should be appreciated that although the lip 1033 is referred to as vertically above the catch 1034 in the disengaged position, a portion of the lip 1033 may remain in contact with a top surface of the catch 1034. In the exemplary aspect depicted in FIG. 25, the latch sensor 1038 (e.g., a switch) is no longer depressed when lip 1033 is moved vertically above the catch 1034, which causes the latch sensor 1038 to detect that the latch 1032 is disengaged.

Figure 26:
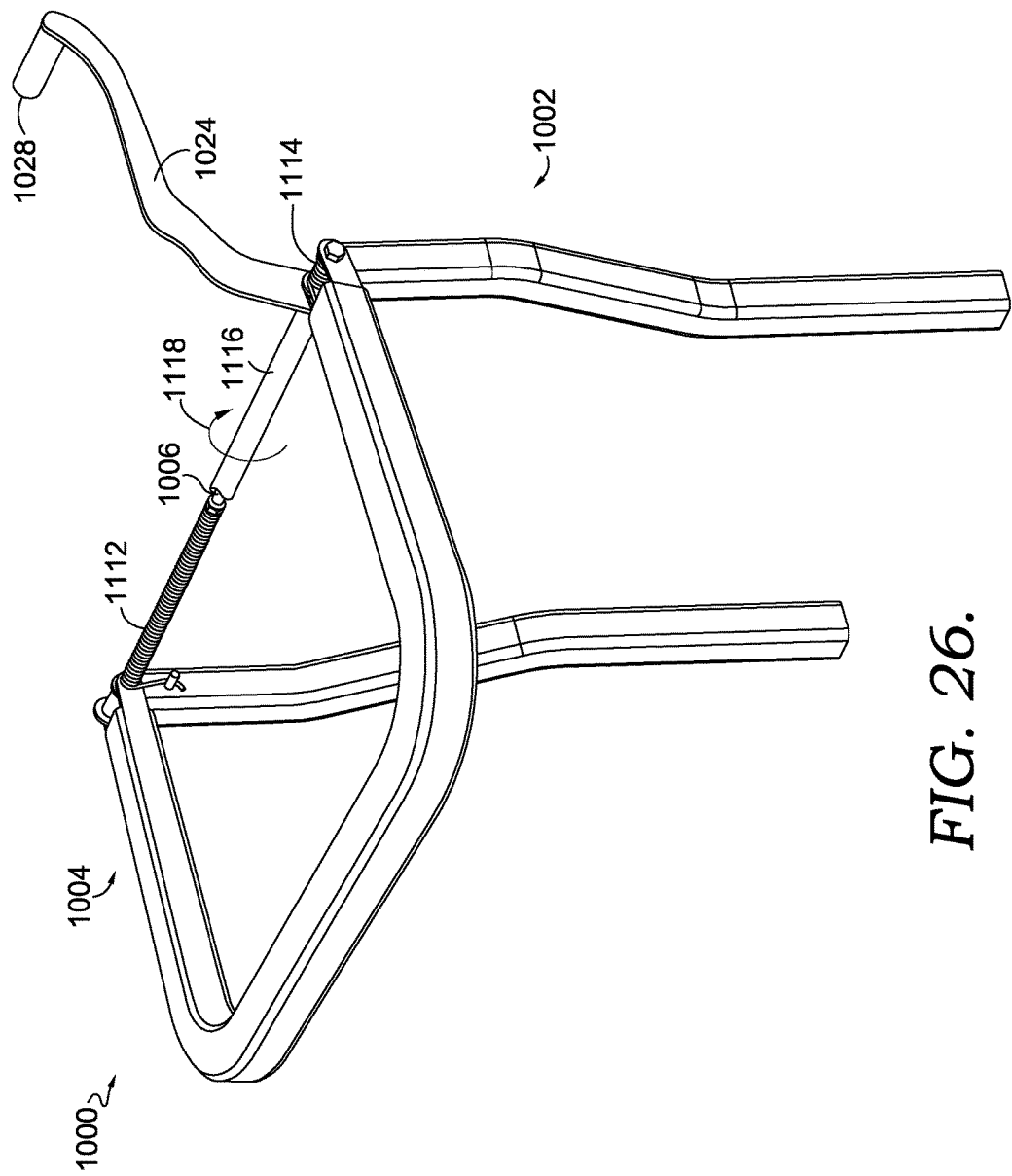
FIG. 26 depicts an alternative perspective view of additional aspects of the lever-actuated operator protection apparatus, in the lowered position, in accordance with aspects hereof.

FIG. 26 depicts additional aspects of the lever-actuated operator protection apparatus 1000. For example, in some aspects, the lever-actuated operator protection apparatus 1000 may not include a lever linkage. Further, in other aspects, the torque member 1006 may be directly coupled with the operator protection apparatus first side 1002 and the operator protection apparatus second side 1004. Additionally, the lever 1024 may be coupled with the lever-actuated operator protection apparatus 1000 at the torque member 1006. The torque member 1006 distributes and/or transmits torque applied via the lever 1024 to each of the operator protection apparatus first side 1002 and the operator protection apparatus second side 1004. In this case, the lever 1024 is effective to transmit a rotational force to the torque member 1006, thereby facilitating movement of the upper portion 110 between the raised and lowered positions. The torque member 1006 may be a tube, a rod, a shaft, or any other suitable structure for transferring force between the operator protection apparatus first side 1002 and the operator protection apparatus second side 1004.

As shown in FIG. 26, the torque member 1006 may be positioned at any suitable location, for example, coaxially with the hinge joint 120. Additionally, the lever-actuated operator protection apparatus 1000 may include a variety of return/lift-assist mechanisms that facilitate rotation of the upper portion 110 from the lowered position toward the raised position. In one exemplary aspect, the lever-actuated operator protection apparatus 1000 may include a torque member torsion spring 1112 that is fitted about the torque member 1006. The torque member torsion spring 1112 may be affixed to the torque member 1006 (e.g., via a clamp) and the lower portion 102 (e.g., via a bracket at the operator protection apparatus second side 1004). The torque member torsion spring 1112 may be fixed relative to the lower portion 102 such that the torque member torsion spring 1112 applies a rotational force 1118 to the torque member 1006. Accordingly, the torque member torsion spring 1112 provides a rotational force that decreases an amount of force required by the lever 1024 to move the upper portion 110 to the raised position. Additionally, the torque member torsion spring 1112 may be surrounded by a cover 1116 (shown here in a cutaway view to show the torque member torsion spring 1112) such that the torque member torsion spring 1112 is enclosed within the cover 1116.

In another exemplary aspect, the lever-actuated operator protection apparatus 1000 may include a hinge joint torsion spring 1114 coupled about the hinge joint 120 and having opposing ends affixed to the lower portion 102 and the upper portion 110. Accordingly, the hinge joint torsion spring 1114 may provide a force that coincides with rotation of the upper portion 110 about the hinge joint 120 toward the raised position.

It should be appreciated that the return/lift-assist mechanisms depicted in the figures (e.g., FIGS. 12, 21, and 26) are exemplary only and are not intended to be limiting. Rather any suitable mechanism (e.g., tension, compression, helical, rotary, and coil springs, counter weights, gas cylinders, and the like) that aids in moving the upper portion 110 between the lowered and raised position is considered within the scope of this disclosure. Additionally, the return/lift-assist mechanisms may provide a dampening effect that support at least a portion of the weight of the upper portion 110 as the upper portion 110 moves toward the lowered position. Accordingly, the return/lift-assist mechanisms lessen an amount of force that an operator must apply to the lever 1024 to both raise and lower the upper portion 110. Further, such return/lift-assist mechanisms are not limited to the locations for positions depicted in the figures. Instead, the return/lift-assist mechanisms may be coupled with the lever-actuated operator protection apparatus 1000 at any suitable location to counteract the weight of the upper portion 110 and/or assist in actuating the lever 1024 to move the upper portion between the raised and lowered positions.

Turning now to a general discussion of each of the embodiments described hereinabove, a variety of features discussed with respect to specific embodiments may be implemented with any of the embodiments described herein. Additionally, some of the features described hereinabove may include variations, which may be applicable to each of the embodiments described herein. For example, although the embodiments described hereinabove and depicted in the figures may provide advantageous configurations, other configurations should be considered within the scope of this disclosure.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

What is claimed:

1. An operator protection apparatus for a terrain working vehicle comprising:
    a lower portion having a lower portion first end and a lower portion second end;
    an upper portion having an upper portion first end and an upper portion second end;
    a hinge joint coupling the lower portion second end and the upper portion first end such that the upper portion is movable relative to the lower portion between a raised position and a lowered position; and
    a lever having a lever first end coupled with the operator protection apparatus and a lever second end positioned forward of the hinge joint when the upper portion is in the raised position and in the lowered position, wherein the lever is effective to move the upper portion between the raised position and the lowered position.

2. The operator protection apparatus of claim 1, further comprising a lever linkage coupled with the upper portion and the lower portion.

3. The operator protection apparatus of claim 2, wherein the lever first end is coupled with the operator protection apparatus at the lever linkage.

4. The operator protection apparatus of claim 2, further comprising a return spring coupled with the lever linkage and the hinge joint.

5. The operator protection apparatus of claim 1, further comprising a latching mechanism having a latch coupled with the lever and a catch coupled with the lower portion.

6. The operator protection apparatus of claim 5, wherein the latching mechanism is biased toward an engaged position in which the latch maintains contact with the catch, and is effective to retain the lever in a position that maintains the upper portion in the raised position.

7. The operator protection apparatus of claim 6, wherein the lever is effective to move the latching mechanism from the engaged position to a disengaged position when the lever moves the upper portion from the raised position toward the lowered position.

8. An operator protection apparatus for a terrain working vehicle comprising:
- an operator protection apparatus first side and an operator protection apparatus second side laterally spaced apart from the operator protection apparatus first side;
- a lower portion having a lower portion first end and a lower portion second end;
- an upper portion having an upper portion first end and an upper portion second end;
- a hinge joint coupling the lower portion second end and the upper portion first end such that the upper portion is movable relative to the lower portion between a raised position and a lowered position; and
- a lever having a lever first end coupled with the operator protection apparatus at the operator protection apparatus first side and a lever second end positioned forward of the hinge joint when the upper portion is in the raised position and in the lowered position, wherein the lever is effective to move the upper portion between the raised position and the lowered position.

9. The operator protection apparatus of claim 8, further comprising a first lever linkage coupled with the upper portion and the lower portion at the operator protection apparatus first side and a second lever linkage coupled with the upper portion and the lower portion at the operator protection apparatus second side.

10. The operator protection apparatus of claim 9, wherein the lever first end is coupled with the operator protection apparatus at the first lever linkage.

11. The operator protection apparatus of claim 9, further comprising a torque member coupled with the first lever linkage and coupled with the second lever linkage.

12. The operator protection apparatus of claim 8, further comprising a torque member coupled with the operator protection apparatus first side and the operator protection apparatus second side.

13. The operator protection apparatus of claim 12, wherein the lever is coupled with the operator protection apparatus at the torque member.

14. The operator protection apparatus of claim 12, further comprising a torsion spring coupled with the lower portion and the torque member such that the torsion spring is effective to transmit a rotational force to the torque member.

15. An operator protection apparatus for a terrain working vehicle having a seat, the operator protection apparatus comprising:
- a lower portion having a lower portion first end and a lower portion second end;
- an upper portion having an upper portion first end and an upper portion second end;
- a hinge joint coupling the lower portion second end to the upper portion first end such that the upper portion is movable relative to the lower portion between a raised position and a lowered position;
- a lever linkage having a lever linkage first link coupled with the lower portion and a lever linkage second link coupled with the lever linkage first link and the upper portion, wherein the lever linkage first link is coupled with the lever linkage second link at a lever linkage pivot joint; and
- a lever having a lever first end coupled with the lever linkage and a lever second end positioned forward of the hinge joint when the upper portion is in the raised position, wherein the lever is effective to move the upper portion between the raised position and the lowered position.

16. The operator protection apparatus of claim 15, wherein the lever first end is coupled with the lever linkage at the lever linkage first link.

17. The operator protection apparatus of claim 15, further comprising a latching mechanism having a latch coupled with the lever, the latch having a lip, and a catch coupled with the lower portion.

18. The operator protection apparatus of claim 17, wherein the latching mechanism comprises a biasing mechanism that biases the latch toward an engaged position in which the lip of the latch maintains contact with the catch.

19. The operator protection apparatus of claim 18, wherein the lever is effective to move the latch from the engaged position to a disengaged position, in which the lip of the latch is above the catch, when the lever moves the upper portion from the raised position toward the lowered position.

20. The operator protection apparatus of claim 17, further comprising a sensor operably coupled with the latching mechanism, the sensor being effective to detect a position of the latching mechanism.

* * * * *